(12) United States Patent
Matias et al.

(10) Patent No.: US 11,811,968 B2
(45) Date of Patent: Nov. 7, 2023

(54) SYNCHRONOUS COMMUNICATION USING VOICE AND TEXT

(71) Applicant: Google LLC, Mountain View, CA (US)

(72) Inventors: Shavit Matias, Tel Aviv (IL); Noam Etzion-Rosenberg, Tel Aviv (IL); Rebecca Chiou, San Mateo, CA (US); Benjamin Schlesinger, Tel Aviv (IL); Brandon Charles Barbello, Mountain View, CA (US); Ori Kabeli, Yehud (IL); Usman Abdullah, Sunnyvale, CA (US); Eric Erfanian, Bellevue, WA (US); Michelle Tadmor, Tel Aviv (IL); Aditi Bhargava, Cortlandt, NY (US); Jan Piotr Jedrzejowicz, San Francisco, CA (US); Alex Agranovich, Herzliya (IL); Nir Shemy, Tel Aviv (IL); Paul Dunlop, London (GB); Yossi Matias, Tel Aviv (IL); Kyungmin Youn, Thalwil (CH); Nadav Bar, Tel Aviv (IL)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/266,534

(22) PCT Filed: Jan. 8, 2019

(86) PCT No.: PCT/US2019/012723
§ 371 (c)(1),
(2) Date: Feb. 5, 2021

(87) PCT Pub. No.: WO2020/055446
PCT Pub. Date: Mar. 19, 2020

(65) Prior Publication Data
US 2021/0314440 A1   Oct. 7, 2021

Related U.S. Application Data

(60) Provisional application No. 62/729,227, filed on Sep. 10, 2018.

(51) Int. Cl.
*H04M 3/42* (2006.01)
*H04M 3/436* (2006.01)

(52) U.S. Cl.
CPC ....... *H04M 3/436* (2013.01); *H04M 3/42042* (2013.01); *H04M 3/42136* (2013.01); *H04M 2201/42* (2013.01)

(58) Field of Classification Search
CPC ............. H04M 3/42136; H04M 3/436; H04M 3/42042; H04M 2201/42
(Continued)

(56) References Cited

U.S. PATENT DOCUMENTS

2009/0086953 A1   4/2009  Vendrow
2017/0171387 A1*  6/2017  Vendrow ............. H04M 3/4365
(Continued)

FOREIGN PATENT DOCUMENTS

CN    101005528    7/2007
WO    2020055446   3/2020

OTHER PUBLICATIONS

"International Preliminary Report on Patentability", Application No. PCT/US2019/012723, dated Mar. 9, 2021, 8 pages.

(Continued)

*Primary Examiner* — Ahmad F. Matar
*Assistant Examiner* — Jirapon Tulop
(74) *Attorney, Agent, or Firm* — McDonnell Boehnen Hulbert & Berghoff LLP

(57) ABSTRACT

A computing device is described that accepts, a telephone call, from another device, initiated by a caller. Prior to establishing a telephone user interface that receives spoken input from the user and outputs spoken audio from the caller, the computing device executes a call screening service that outputs an audio user interface, to the other device and as part of the telephone call. The audio user interface interro- (Continued)

gates the caller for additional information including a purpose of the telephone call, which allows the user to have more context of the telephone call before deciding whether to accept the call or hang up. The computing device outputs a graphical user interface associated with telephone call. The graphical user interface includes an indication of the additional information obtained via the audio user interface that interrogates the caller.

25 Claims, 12 Drawing Sheets

(58) Field of Classification Search
USPC .......................................................... 455/415
See application file for complete search history.

(56) References Cited

U.S. PATENT DOCUMENTS

2018/0020093 A1* 1/2018 Bentitou ................. G10L 13/00
2018/0152558 A1* 5/2018 Chan ....................... H04W 4/16

OTHER PUBLICATIONS

"International Search Report and Written Opinion", PCT Application No. PCT/US2019/012723, dated Apr. 9, 2019, 13 pages.
"Foreign Office Action", CN Application No. 201980048824.7, dated Jun. 18, 2021, 20 pages.
"Foreign Office Action", CN Application No. 201980048824.7, dated Nov. 22, 2021, 19 pages.

* cited by examiner

SYNCHRONOUS COMMUNICATION USING VOICE AND TEXT

RELATED APPLICATION(S)

This application is a national stage entry of International Application No. PCT/US2019/012723, filed Jan. 8, 2019, which claims benefit of U.S. Provisional Application No. 62/729,227, filed Sep. 10, 2018, the disclosures of which are incorporated herein by reference in their entirety.

BACKGROUND

Some spam and nuisance callers use sophisticated techniques to avoid spam detection systems. As a result, users may receive unwanted telephone calls, originating from unknown or unfamiliar telephone numbers. Even if an incoming telephone call originates from a familiar telephone number, the purpose of the telephone call may not always be clear. That is, users may lack enough information to decide whether to answer, ignore, or decline an incoming call. As such, many users, as a matter of course, simply do not answer telephone calls, particularly telephone calls from unknown numbers.

SUMMARY

In general, techniques of this disclosure enable a form of synchronous communication using a combination of voice and text. An example call screening service (CSS) screens incoming telephone calls, by interrogating callers as to the purpose of their call, before or instead of enabling direct voice communication between the caller and the user. The example CSS may execute, in its entirety, locally on a mobile device, for example, to further security and to promote user privacy. The example CSS may classify an incoming caller according to a particular type and provide an interrogation experience tailored for the particular type of caller. To conduct the interrogation, the example CSS may analyze and transcribe incoming telephony audio data and automatically generate outgoing telephony audio data for synchronously communicating with the caller. The communication between the caller and the example CSS is two-way communication (as opposed to one-way); that is both the caller and the example CSS communicate in a back-and-forth manner. The example CSS may present an ongoing transcription of the interrogation with the caller and receive user inputs in response to the transcription. Such user inputs may cause the example CSS to asynchronously adjust how or what the example CSS communicates to the caller (i.e., the user inputs may cause specific questions or specific statements to be made by the example CSS during the interrogation, at the user's discretion and on the user's behalf). The example CSS interrogates the caller, based on the asynchronous user inputs received during the interrogation or based on past asynchronous user inputs received during previous interrogations. The example CSS interrogates the caller until the caller hangs-up or until the user selects an option presented by the example CSS for terminating the interrogation, including ending the call, establishing user-to-caller and caller-to user voice communication through the telephone call, etc.

Throughout the disclosure, examples are described where a computing device and/or computing system may analyze information (e.g., contextual information, user and/or device data, etc.). However, the system may only use the information after the computing device and/or the computing system receives explicit permission from a user of the computing device and/or the computing system. For example, in situations discussed below in which the computing device and/or computing system may collect information about user interactions with applications executing at computing devices or computing systems, individual users may be provided with an opportunity to provide input to control whether programs or features of the computing device and/or computing system can collect and make use of the information. The individual users may further be provided with an opportunity to control what the programs or features can or cannot do with the information.

In addition, information collected may be pre-treated in one or more ways before it is transferred, stored, or otherwise used by a computing device and/or computing system, so that personally-identifiable information is removed. For example, before an example computing system stores user interaction data associated with an application executing at a computing device, the example computing system may pre-treat the data to ensure that any user identifying information or device identifying information embedded in the data is removed. Thus, the user may have control over whether information is collected about the user and user's device, and how such information, if collected, may be used by the computing device and/or computing system.

In one example, a method is described that includes accepting, by a computing device, a telephone call, from another device, initiated by a caller; prior to establishing a telephone user interface that receives spoken input from the user and outputs spoken audio from the caller, executing, by the computing device, a call screening service that outputs an audio user interface, to the other device and as part of the telephone call, wherein executing the call screening service comprises interrogating the caller, via the audio interface, for additional information including a purpose of the telephone call; and outputting, by the computing device, a graphical user interface associated with telephone call, wherein the graphical user interface includes an indication of the additional information obtained via the audio user interface that interrogates the caller.

In another example, a computer-readable storage medium is described including instructions that, when executed, cause at least one processor to: accept, a telephone call, from another device, initiated by a caller; prior to establishing a telephone user interface that receives spoken input from the user and outputs spoken audio from the caller, execute a call screening service that outputs an audio user interface, to the other device and as part of the telephone call by at least interrogating the caller, via the audio interface, for additional information including a purpose of the telephone call; and outputs a graphical user interface associated with telephone call, wherein the graphical user interface includes an indication of the additional information obtained via the audio user interface that interrogates the caller.

In another example, a computing system is described that includes at least one processor configured to accept, a telephone call, from another device, initiated by a caller; prior to establishing a telephone user interface that receives spoken input from the user and outputs spoken audio from the caller, execute a call screening service that outputs an audio user interface, to the other device and as part of the telephone call by at least interrogating the caller, via the audio interface, for additional information including a purpose of the telephone call; and outputs a graphical user interface associated with telephone call, wherein the graphical user interface includes an indication of the additional information obtained via the audio user interface that interrogates the caller.

In another example, a system is described including means for accepting a telephone call, from another device, initiated by a caller; prior to establishing a telephone user interface that receives spoken input from the user and outputs spoken audio from the caller, means for executing a call screening service that outputs an audio user interface, to the other device and as part of the telephone call, wherein the means for executing the call screening service comprise means for interrogating the caller, via the audio interface, for additional information including a purpose of the telephone call; and means for outputting a graphical user interface associated with telephone call, wherein the graphical user interface includes an indication of the additional information obtained via the audio user interface that interrogates the caller.

The details of one or more examples are set forth in the accompanying drawings and the description below. Other features, objects, and advantages of the disclosure will be apparent from the description and drawings, and from the claims.

DETAILED DESCRIPTION

Figure 1:
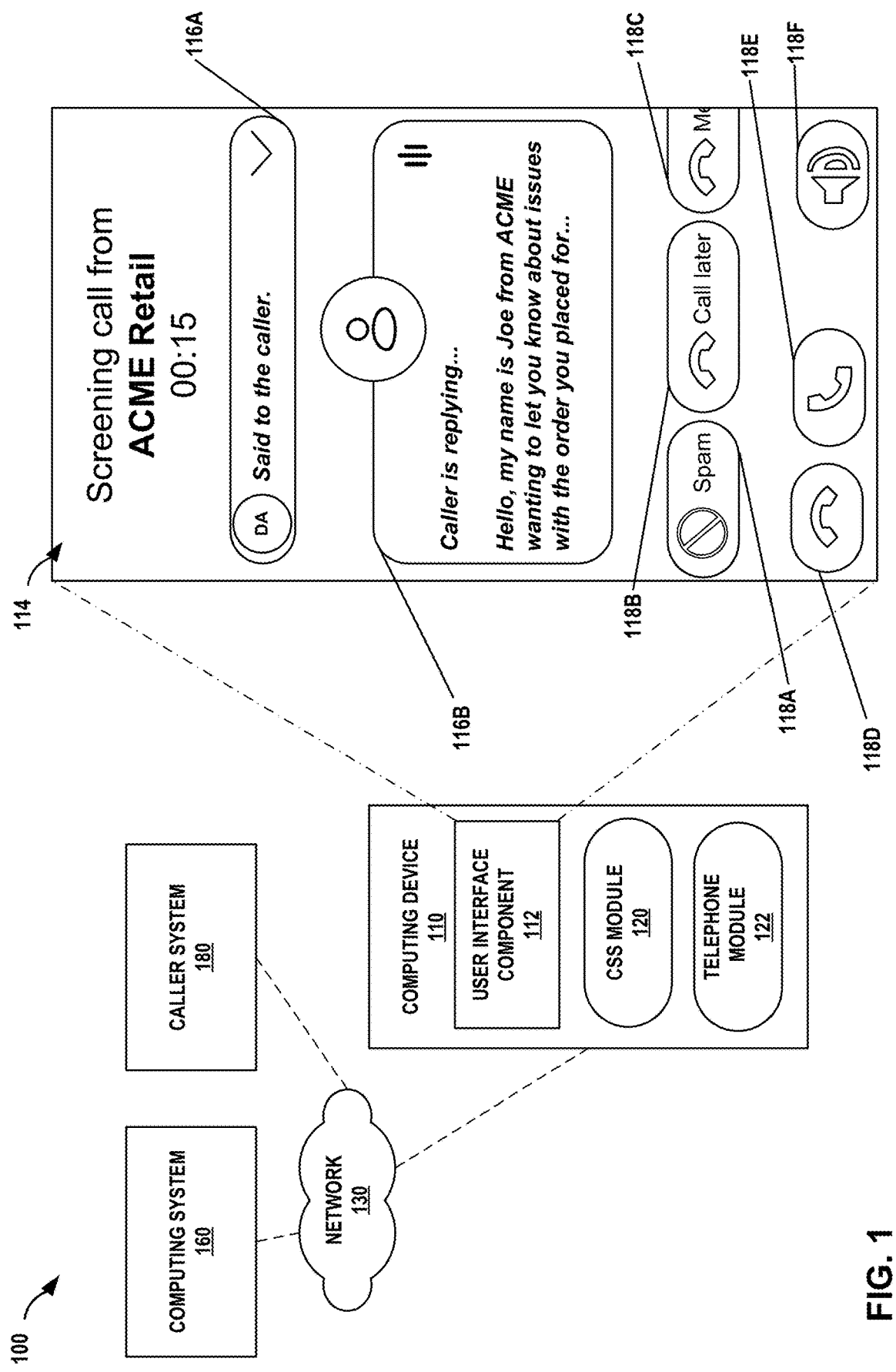
FIG. 1 is a conceptual diagram illustrating an example system including an example computing device that executes a call screening service, in accordance with one or more aspects of the present disclosure.

FIG. 1 is a conceptual diagram illustrating an example system including an example computing device that executes a call screening service (CSS), in accordance with one or more aspects of the present disclosure. System 100 of FIG. 1 includes computing device 110, caller system 180, and computing system 160, communicatively coupled to network 130.

Although operations attributed to system 100 are described primarily as being performed locally, by computing device 110, in some examples, the operations of system 100 may be performed by multiple computing devices and systems, including additional computing devices and systems beyond what is shown in FIG. 1. For example, caller system 180, computing system 160, or any other device or system communicatively coupled to network 130, may perform some or all of the functionality of computing device 110, or vice versa.

Network 130 represents any public or private communications network for transmitting data between computing systems, servers, and computing devices. Network 130 may include a public switched telephone network (PSTN), a wireless network (e.g., cellular, Wi-Fi®, and/or other wireless network), a wired network (e.g., a local area network (LAN), a wide area network (WAN), the Internet, etc.), an Internet Protocol (IP) telephony network, such as voice-over-IP (VoIP) network, or any other type of communications network. Network 130 may include one or more network hubs, network switches, network routers, or any other network equipment, that are operatively inter-coupled thereby providing for the exchange of information between computing system 160, caller system 180, and computing device 110. Computing system 160, caller system 180, and computing device 110 may transmit and receive data across network 130 using any suitable communication techniques.

Computing system 160, caller system 180, and computing device 110 may each be operatively coupled to network 130 using respective network links. The links coupling computing system 160, caller system 180, and computing device 110 to network 130 may be Ethernet, or other types of network connections, and such connections may be wireless and/or wired connections. In some examples, the links coupling computing system 160, caller system 180, and computing device 110 to network 130 may be IP telephony links, such as VoIP or other similar telecommunications links. In some examples, the links coupling computing system 160, caller system 180, and computing device 110 to network 130 may be IP Multimedia Subsystem (IMS) links using Session Initiated Protocol (SIP) signaling, circuit switched (CS) links, or other type of telecommunications links.

Caller system 180 represents any combination of one or more computers, computing devices, mainframes, servers (including so-called "blades"), cloud computing systems, or other types of remote computing systems capable of communicating information via network 130 to implement a telephone call between caller system 180 and computing device 110. That is, caller system 180 may execute operations for transmitting and receiving telephony data with computing device 110 via network 130. For example, caller system 180 may be a mobile telephone, landline telephone, laptop computer, workstation at a telephone call center, or other computing device configured to provide user access to telephone services.

Computing system 160 represents any combination of one or more computers, mainframes, servers (including so-called "blades"), cloud computing systems, or other types of remote computing systems capable of exchanging information via network 130 as part of a CSS accessed by computing device 110. That is, computing system 160 may store, or provide access to, additional processors, stored data, or other computing resources needed by computing device 110 to implement the described techniques for enabling local, on-device call screening by computing device 110.

Computing device 110 represents any suitable computing device or computing system capable of exchanging information via network 130 to perform local, on-device CSS techniques. For example, computing device 110 may be a mobile telephone from which a user provides asynchronous non-telephone inputs to accept or reject a telephone call from a caller entity, such as caller system 180, instead of providing synchronous telephone inputs to accept or reject the telephone call, directly. Examples of computing device 110 beyond just mobile phones include: tablet computers, laptop computers, desktop computers, servers, mainframes, workstations, landline, satellite, cellular, Wi-Fi®, or VoIP telephones, wearable devices (e.g., computerized watches, etc.), home automation devices, assistant devices, gaming consoles and systems, media players, e-book readers, television platforms, automobile navigation or infotainment systems, or any other type of mobile, non-mobile, wearable, and non-wearable computing devices configured to exchange information via a network, such as network 130.

Computing device 110 includes call screening service ("CSS") module 120, telephone module 122, and further includes user interface component ("UIC") 112 which is configured to output a user interface, such as CSS user interface 114. Modules 120 and 122 may perform operations described herein using software, hardware, firmware, or a mixture of hardware, software, and firmware residing in and/or executing at one of computing device 110, computing system 160, and caller system 180. Computing device 110, computing system 160, and caller system 180 may execute modules 120 and 122 with multiple processors or multiple devices, as virtual machines executing on underlying hardware, as one or more services of an operating system or computing platform, and/or as one or more executable programs at an application layer of a computing platform. In some examples, computing device 110, computing system 160, and caller system 180 may download any of modules 120 and 122 from an application repository (e.g., an app store) or other database. In some examples, computing device 110, computing system 160, and caller system 180 are preloaded with any of modules 120 and 122 during production and prior to being provided to a user. In other examples, computing device 110, computing system 160, and caller system 180 are loaded with any of modules 120 and 122 after production or after being provided to a user.

While shown in FIG. 1 as computing device 110 including UIC 112, CSS module 120, and telephone module 122, modules 120 and 122 and the functionality thereof may be distributed differently between computing device 110, computing system 160, and caller system 180. As one example, in some instances, caller system 180 or computing system 160 may include all or part of the functionality of CSS module 120.

UIC 112 of computing device 110 may function as an input and/or output device for computing device 110. UIC 112 may be implemented using various technologies. For instance, UIC 112 may function as an input device using presence-sensitive input screens, microphone technologies, infrared sensor technologies, or other input device technology for use in receiving user input. UIC 112 may function as output device configured to present output to a user using any one or more display devices, speaker technologies, haptic feedback technologies, or other output device technology for use in outputting information to a user. UIC 112 may be used by computing device 110 to output, for display, a GUI, such as CSS user interface 114.

Telephone module 122 handles telephone functionality on behalf of computing device 110. For example, telephone module 122 may also be referred to as a "dialer" and may be an application or component of a computing platform or operating system of computing device 110 that configures computing device 110 to function as a telephone. Telephone module 122 may perform outbound calling operations, for instance, by initiating telephone calls with external devices, such as caller system 180. Telephone module 122 may handle incoming telephone calls as well, for example, by supporting the exchange of telephony data between computing device 110 and an external device, thereby enabling a telephone call between computing device 110 and the external device. Telephone module 122 may perform operations in furtherance of an existing telephone call as well, for example, by merging calls, placing calls on hold, accepting, rejecting, or forwarding calls, and other telephone related operations.

Telephone module 122 may cause UIC 112 to present a telephone user interface associated with the telephone functionality of computing device 110. The user interface of telephone module 122 may include a numerical keypad or other input elements from which a user can provide input to dial a telephone number. The user interface of telephone module 122 may include menus or options for performing telephone related tasks, such as playing voice messages, reviewing calling histories, looking up contacts in an electronic address book, and the like. Telephone module 122 may provide information requested by CSS module 120 to cause UIC 112 to present a CSS user interface, such as CSS user interface 114, from which a user of computing device 110 can more intelligently manage incoming telephone calls, such as those originating from caller system 180.

CSS module 120 manages a CSS that executes at computing device 110. CSS module 120 of computing device 110 presents a graphical user interface, such as CSS user interface 114, from which a user of computing device 110 can interact with the CSS managed by CSS module 120, e.g., to more intelligently manage incoming telephone calls, such as those originating from caller system 180. In some cases, CSS user interface 114 of CSS module 120 is a stand-alone user interface to the CSS provided by CSS modules 120. In other examples, CSS user interface 114 forms part of, or a portion of a different user interface, such as the telephone user interface output by telephone module 122 or an operating system user interface presented by computing device 110.

In providing the graphical user interface, CSS module 120 of computing device 110 controls UIC 112 by at least determining what UIC 112 presents and how. CSS module 120 may further control what information is exchanged with computing device 110 via network 130, in furtherance of the graphical user interface. For example, in controlling what UIC 112 displays, CSS module 120 may receive information from a component of computing device 110 (e.g., telephone module 122) or computing system 160 that forms a basis for some or all of CSS user interface 114. In response, CSS module 120 may output instructions and information to UIC 112 that cause UIC 112 to display CSS user interface 114 according to the information received from the component of computing device 110 or computing system 160.

In the example of FIG. 1, CSS user interface 114 includes graphical elements 116A and 116B (collectively referred to as "graphical elements 116") that each present a portion of spoken audio heard via a telephone call that was intercepted by CSS module 120. Graphical element 116A is a collapsed view of what a digital assistant spoke to a caller. Graphical element 116B is an expanded view of what the caller spoke to the digital assistant in response.

CSS module 120 may cause graphical elements 116A and 116B to be expanded or collapsed depending on which party in the interrogation (i.e., the caller or the CSS) is currently speaking. For instance, as the caller is replying in the example of FIG. 1, CSS module 120 causes graphical element 116B to be in expanded form for displaying content spoken by the caller. Whereas, CSS module 120 causes graphical element 116A to be in expanded form for displaying content spoken by the CSS and then causes graphical element 116A to be in collapsed form when the CSS stops outputting spoken audio or in response to detecting audio spoken by the caller. At any time, a user of computing device 110 may provide input at graphical elements 116A or 116B to cause an expansion or collapsing of content contained in graphical elements 116A and 116B.

CSS user interface 114 further includes graphical elements 118A through 118F (collectively referred to as "graphical elements 118"). Each of graphical elements is associated with a different user-selectable option for managing a telephone call that was intercepted by CSS module 120.

For example, graphical elements 118A through 118C are associated with options for adjusting or modifying the direction of an ongoing interrogation with a caller. In other words, graphical elements 118A through 118C provide an asynchronous input feature of CSS user interface 114 for communicating with CSS module 120 so as to directly modify or adjust how CSS module 120 interrogates a caller. Graphical element 118A provides an option to mark a caller and telephone call as a spam or an unwanted solicitation, survey, etc. and cause CSS module 120 to speak to the caller "Sorry, the person you're trying to reach can't take a call right now. Thanks, and goodbye." Graphical element 118B provides an option to request that CSS module 120 inform the caller that the user of computing device 110 will call them back later. And, although partially hidden from view in FIG. 1, graphical element 118C is associated with an option to request that CSS module 120 inform the caller that the user of computing device 110 would like the caller to send them a text-based message. Of course, these are just some examples of graphical elements 118A through 118C, in other examples additional options for modifying an interrogation are possible. For example, graphical elements 118A through 118C may be associated with canned or predetermined responses that a user may want to provide to the caller. Such responses may be learned overtime by CSS module 120 based on how a user of computing device 110 (or other similar CSS users) have responded during previous or ongoing interrogations, with other, similarly classified callers.

Whereas graphical elements 118D through 118F are associated with actions to adjust or modify the audio interface provided by CSS module 120 (i.e., the spoken dialogue output by CSS module 120 while CSS module 120 interrogates a caller). Graphical elements 118D through 118F provide an asynchronous input feature of CSS user interface 114 for communicating with CSS module 120 so as to directly control whether CSS module 120 terminates, answers, or listens-in on, a telephone call being managed by CSS module 120. In so doing, the asynchronous input features may enable user control over how CSS module 120 speaks to a caller when terminating, answering, or listening in.

For example, Graphical element 118D provides an option to hang-up or terminate a telephone call and cause CSS module 120 to speak to the caller "Sorry, the person you're trying to reach can't take a call right now. Thanks, and goodbye." Graphical element 118E provides an option to end an ongoing interrogation by answering the telephone call and cause CSS module 120 to speak to the caller "Thanks, connecting you now." Graphical element 118F provides an option to neither terminate or answer the telephone call, but instead provides an option to listen-in in on the interrogation. CSS module 120 may, after answering a telephone call, CSS module 120 may cause UIC 112 to output audio of the interrogation, to allow the user to listen to CSS module 120 and the caller. When the listen-in option is selected, CSS module 120 may output audio of an interrogation while ensuring a microphone of UIC 112 of computing device 110 remains muted, to prevent a user of computing device 110 from speaking directly to the caller.

Of course, these are just some examples of graphical elements 118D through 118F, in other examples additional or different options for controlling the telephone call may be used. For example, graphical elements 118D through 118F may be associated with options for forwarding an incoming call, merging an incoming call with another telephone call, or causing CSS module 120 to speak to a caller in different ways.

When handling input detected by UIC 112, CSS module 120 may receive information from UIC 112, in response to one or more inputs detected at respective locations of a presence-sensitive input component of UIC 112, that correspond to locations of a display component of UIC 112 at which graphical elements 116 and 118 of CSS user interface 114 are displayed. CSS module 120 may disseminate information about inputs detected by UIC 112 to other components of computing device 110 or computing system 160 for interpreting the inputs and for causing computing device 110 to perform one or more functions in response to the inputs. In some examples, CSS module 120 may receive an indication of one or more user inputs detected at UIC 112 and may output information about the user inputs to telephone module 122 or any other application or component of computing device 110 for which the user inputs are intended. For example, UIC 112 may detect a user input at a location of UIC 112 at which graphical element 118E is displayed and send data about the user input to CSS module 120.

CSS module 120 may interpret one or more touch events based on the detected input. A touch event may include information that characterizes user input, such as a location component (e.g., [x,y] coordinates) of the user input, a time component (e.g., when the user input was received), a force component (e.g., an amount of pressure or force applied by the user input), or other data (e.g., speed, acceleration, direction, density, an amount of area of the touch-sensitive component that detected the touch, etc.) about the user input.

Based on location information of the touch events generated from the user input, CSS module 120 may determine that the detected user input is associated with graphical element 118E (e.g., an option to end an ongoing interrogation answer the telephone call). CSS module 120 may send an instruction to telephone module 122 (e.g., to answer the telephone call by establishing a voice communication channel between the user and the caller) or in some cases, CSS module 120 may send an indication of the one or more touch events to telephone module 122 for further interpretation.

In operation, computing device 110 may receive, via network 130, a telephone call initiated by a caller from a different device, such as caller system 180. Prior to the telephone call being handled by telephone module 122, CSS module 120 may intercept the incoming telephone call.

As a precursor to handing telephone call management duties over to telephone module 122 to conduct the telephone call, CSS module 120 may establish its own audio user interface (also sometimes referred to as a "sound user interface") over the telephone call to obtain additional information about the caller and the purpose of the telephone call. Examples of additional information include a caller's name, a caller's stated purpose of the call, an associated business, educational institution, charity, government department, or other additional information that indicates an intended purpose of the telephone call or otherwise puts the telephone call in context to better help a user decide whether to answer the telephone call or not.

CSS module 120 interrogates the caller via the audio user interface over the telephone call, for the additional information so that the user of computing device 110 can decide an action for CSS module 120 to take, in response to the telephone call. Said differently, CSS module 120 may output, to a calling device, such as caller system 180, and as part of the telephone call, telephone audio outputs, such as audio of a spoken request for additional information. CSS module 120 may receive, from the other device and as part of the telephone call, telephone audio inputs, such as audio of a spoken response from a caller that includes the additional information.

CSS module 120 may transmit, via the audio user interface of the telephone call, computer-generated spoken output and may receive, via the audio user interface, spoken input from the caller. In other words, CSS module 120 may open an audio user interface between the caller of caller system 180 and a speech-engine or other pre-recorded or computer-generated voice of CSS module 120 so that CSS module 120 and the caller may communicate using respective voices, via the telephone call.

For example, a speech engine of CSS module 120 may output spoken audio to caller system 180 that includes an introductory statement "Hi, the person you're calling is using a screening service and will get a copy of this conversation. Go ahead and say your name, and why you're calling." In response to hearing the introductory statement, the caller has two primary options to proceed (although in some examples there may be more than two options) including: hang-up or otherwise terminate the telephone call from calling system 180, or speak with CSS module 120, via the audio user interface, to provide the additional information requested from the introductory statement. For example, CSS module 120 may receive voice inputs from the caller indicating a response to the introductory statement. The response may be "Hello, my name is Joe from ACME wanting to let you know about issues with the order you placed for . . . " CSS module 120 may receive the additional information over network 130, and via the telephone call, and use the additional information to build and update CSS interface 114 for screening the caller.

When introducing itself to a caller, CSS module 120 may alert the caller that CSS module 120 is not human. For example, CSS module 120 may preface an introductory statement, as stated above, with "This is a computer-generated voice answering service" or simply "This is a robot . . . "

In some examples, CSS module 120 may communicate to a caller that the CSS is answering on behalf of a particular named user, or may output a synthesized version of a user's voice when communicating to the caller. In this way, CSS module 120 may provide assurances that a caller has called the right user and not dialed an incorrect telephone number.

CSS module 120 may cause UIC 112 to output CSS user interface 114 (in this case a graphical user interface) associated with telephone call. CSS module 120 may cause UIC 112 to include within CSS user interface 144 an indication of the additional information obtained via the audio user interface that interrogates the caller. For example, CSS module 120 may initially output graphical indication 116A in expanded form to include a transcription of the introductory statement. And in response to detecting audio from the caller, CSS module 120 may collapse graphical indication 116A to make room within CSS user interface 114 for graphical indication 116B.

CSS module 120 may transcribe the additional information received from the caller in response to the introductory statement and display each word from the transcription within graphical indication 116B. For example, as shown in FIG. 1, CSS module 120 may cause UIC 112 to display graphical indication 116B within CSS user interface 114 which includes text of the spoken translation. CSS module 120 may display the transcription such that each word appears within graphical indication 116B in near real-time (i.e., concurrent with the caller's spoken audio input). In other words, CSS module 120 may update the transcription included in graphical element 116B while the additional information spoken by the caller and received by CSS module 120.

In some examples, in addition or instead of displaying a transcription of an interrogation, CSS module 120 may output audio of the interrogation. Such output of audio may be automatic, or in response to a user selection of an option to "listen-in".

In some cases, CSS module 120 may output audio of the interrogation to overcome an obstacle in the interrogation, such as an impasse where CSS module 120 does not know how to proceed. For example, CSS module 120 may output a portion of audio associated with an interrogation (e.g., as a useful specific audio-snippet or textual transcription), focused on points of likely interest, including for example a point of communication breakdown. In such a cases, a snippet may be reduced by CSS module 120 to a simple description of the point of interest or communication breakdown.

Returning to graphical elements 118, CSS module 120 may provide, via CSS user interface 114, options or controls for modifying an ongoing interrogation with a caller, or for terminating the interrogation. For example, CSS module 120 may cause UIC 112 to display graphical elements 118 for adjusting the audio user interface between CSS module 120 and caller system 189.

CSS module 120 may receive, via inputs detected by UIC 112 that are associated with CSS user interface 114, one or more user inputs that select any of graphical elements 118. For example, a user of computing device 110 may provide a touch input at or near a location of UIC 112 at which graphical element 118B is displayed.

CSS module 120 may interpret the touch input as a command to instruct the caller that the user of computing device 110 would like the caller to try to call back later. As such, CSS module 120 may control the audio user interface based on the one or more user inputs. That is, based on the one or more user inputs detected at or near graphical element 118B, CSS module 120 may output, via the telephone call, an audible computer-generated voice that requests the caller try to call back later. At which point, CSS module 120 may gracefully end the telephone call on behalf of the user, in some cases, outputting via the telephone call, and in an audible computer-generated voice, the phrase "good bye".

In some cases, CSS module 120 may analyze a telephone call, a caller, and an interrogation to determine a reason for a call or a reason for ending a call and communicate with a caller depending on the reasons. That is, CSS module 120 may end a call by giving a reason (e.g., the caller is in a meeting, traveling, driving, etc.) as determined by CSS module 120 (e.g., from contextual information obtained by computing device 110). And in some cases, CSS module 120 may select a way to end a call that is most appropriate for the type of telephone call, classification of caller, or sentiment in the interrogation, rather than ending a call with just a simple "goodbye".

As such, with reliance on the described techniques of this disclosure, a computing device may execute an on-device CSS that enables asynchronous user inputs to modify or adjust a synchronous voice communication with a caller. As such, because a user need not answer a telephone call until an interrogation has been performed, the described techniques may improve device and personal information security (as callers are prevented from directly speaking to a user). The described techniques may prevent interruptions from known and unknown callers. That is, even if an incoming telephone call originates from a familiar telephone number, the described techniques may enable a computing device to better convey the purpose of the telephone. As such, the described techniques may provide more user control over when and how to respond to telephone calls resulting in less time, communications bandwidth, and electrical energy being consumed by computing devices that received telephone calls.

In addition, because the described techniques are particularly adapted for executing on-device (e.g., as opposed in a cloud computing environment, or other remote system) the described CSS is more secure and a user can better control his or her personal information from being shared outside the computing device. The described techniques provide a way for users that receive telephone calls on computing devices to determine whether a caller is genuine, but also provide a way for the users to query the caller without having to directly interact with them. Users can interact with a caller asynchronously, and indirectly (e.g., to ask follow-up questions), even in situations when audible, telephone calls are not possible (e.g. during a meeting, in a noisy or quiet environment, in public, and in other situations in which conducting telephone calls can be challenging).

As previously stated, the examples presented throughout the disclosure are described where a computing device and/or computing system may analyze information (e.g., contextual information, user and/or device data, etc.) only if first having received explicit information from a user to do so. For example, in situations discussed below in which the computing device and/or computing system may collect information about user interactions with applications executing at computing devices or computing systems, individual users may be provided with an opportunity to provide input to control whether programs or features of the computing device and/or computing system can collect and make use of the information. The individual users may further be provided with an opportunity to control what the programs or features can or cannot do with the information.

In addition, information collected may be pre-treated in one or more ways before it is transferred, stored, or otherwise used by a computing device and/or computing system, so that personally-identifiable information is removed. For example, before an example computing system stores user interaction data associated with an application executing at a computing device, the example computing system may pre-treat the data to ensure that any user identifying information or device identifying information embedded in the data is removed. Thus, the user may have control over whether information is collected about the user and user's device, and how such information, if collected, may be used by the computing device and/or computing system.

Figure 2:
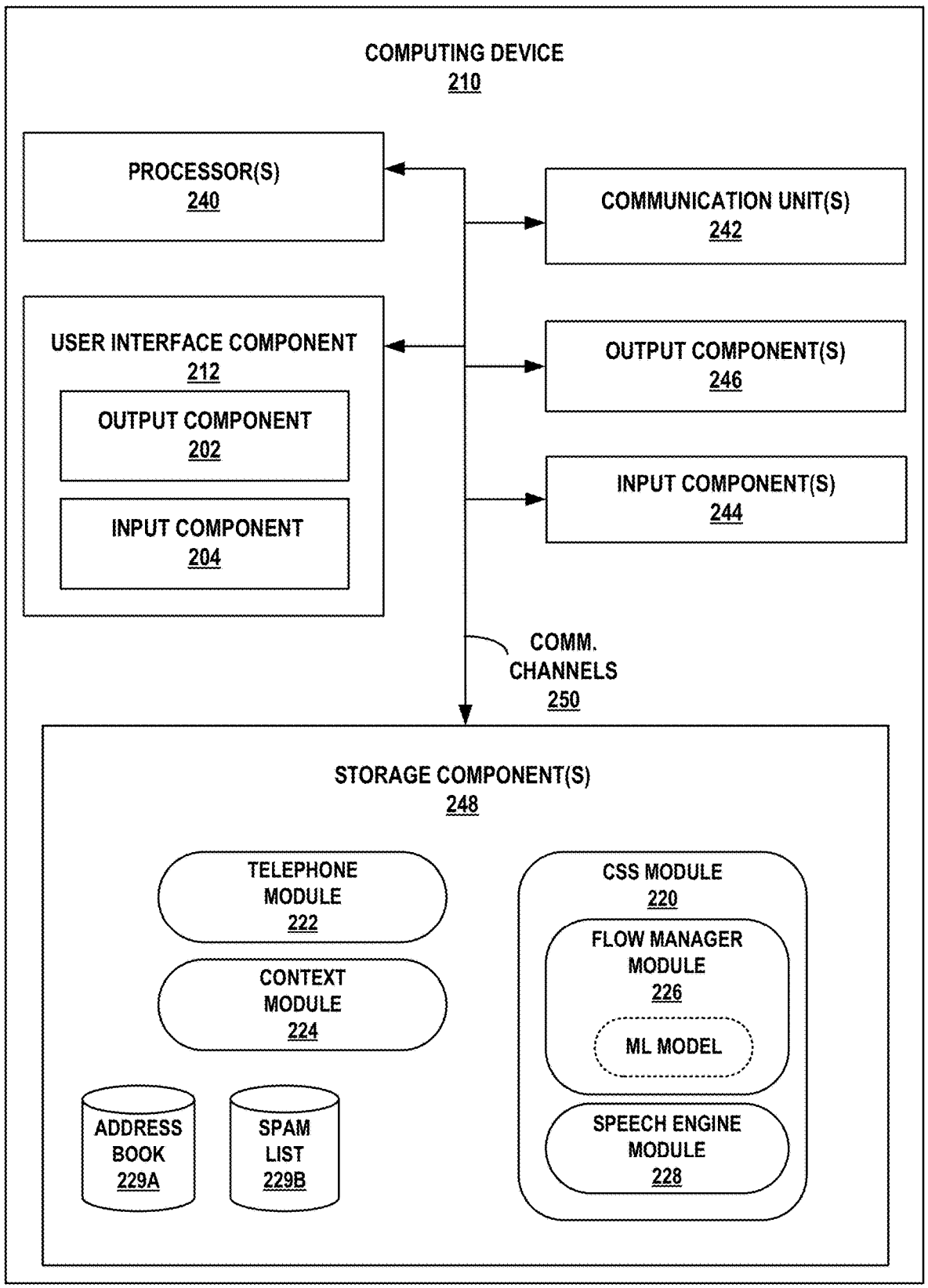
FIG. 2 is a block diagram illustrating an example computing device that executes a call screening service, in accordance with one or more aspects of the present disclosure.

FIG. 2 is a block diagram illustrating an example computing device that executes a call screening service, in accordance with one or more aspects of the present disclosure. FIG. 2 is described in the context of FIG. 1. For example, computing device 210 of FIG. 2 is an example of computing device 110 of FIG. 1. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes user interface component (UIC) 212, one or more processors 240, one or more communication units 242, one or more input components 244, one or more output components 246, and one or more storage components 248. UIC 212 includes output component 202 and input component 204. Storage components 248 of computing device 210 includes CSS module 220, telephone module 222, context module 224, address book 229A, and spam list 229B. CSS module 120 includes caller flow manager module 226 and speech engine module 228.

Communication channels 250 may interconnect each of the components of computing device 210 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on the one or more networks. Examples of communication units 242 include a network interface card (e.g. such as an Ethernet card), an optical transceiver, a radio frequency transceiver, a GPS receiver, or any other type of telecommunication device that can send and/or receive information over a network, such as network 130 of FIG. 1. Other examples of communication units 242 may include short wave radios, cellular voice or data radios, wireless network radios, as well as universal serial bus (USB) controllers, voice over internet protocol (VOIP) radios and other radios included in computing devices having telephone capability.

One or more input components 244 of computing device 210 may receive input. Examples of input are tactile, audio, and video input. Input components 242 of computing device 210, in one example, includes a presence-sensitive input device (e.g., a touch sensitive screen, a PSD), mouse, keyboard, voice responsive system, video camera, microphone or any other type of device for detecting input from a human or machine. In some examples, input components 242 may include one or more sensor components one or more location sensors (GPS components, Wi-Fi® components, Bluetooth® components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output components 246 of computing device 210 may generate output. Examples of output are tactile, audio, and video output. Output components 246 of computing device 210, in one example, includes a PSD, sound card, video graphics adapter card, speaker, cathode ray tube (CRT) monitor, liquid crystal display (LCD), or any other type of device for generating output to a human or machine.

UIC 212 of computing device 210 may be similar to UIC 112 of computing device 110 and includes output component 202 and input component 204. Output component 202 may be a display component, such as a screen at which information is displayed by UIC 212 and input component 204 may be a presence-sensitive input component, such as a touch of capacitive sensor, that detects an object at and/or near output component 202. Output component 202 and input component 204 may be a speaker and microphone pair or any other combination of one or more input and output components, such as input components 244 and output components 244. In the example of FIG. 2, UIC 212 may present a user interface (such as CSS user interface 114 of FIG. 1).

As one example range, presence-sensitive input component 204 may detect an object, such as one or more fingers, a stylus, or one or more other inputs units that are within two inches or less of output component 202. Input component 204 may determine a location (e.g., an [x, y] coordinate) of output component 202 at which the object was detected. In another example range, input component 204 may detect an object six inches or less from output component 202 and other ranges are also possible. Input component 204 may determine the location of output component 202 selected by a user's finger using capacitive, inductive, and/or optical recognition techniques. In some examples, input component 204 also provides output to a user using tactile, audible, or visual stimuli as described with respect to output component 202.

UIC 212 of computing device 210 may detect two-dimensional and/or three-dimensional gestures as input from a user of computing device 210. For instance, a sensor of UIC 212 may detect a user's movement (e.g., moving one or more hands, arms, fingers, other body parts, pens, styluses, etc.) within a threshold distance of the sensor of UIC 212. UIC 212 may determine a two- or three-dimensional vector representation of the movement and correlate the vector representation to a gesture input (e.g., a hand-wave, a pinch, a clap, a pen stroke, etc.) that has multiple dimensions. In other words, UIC 212 can detect a multi-dimension gesture without requiring the user to gesture at or near a screen or surface at which UIC 212 outputs information for display. Instead, UIC 212 can detect a multi-dimensional gesture performed at or near a sensor which may or may not be located near the screen or surface at which UIC 212 outputs information for display.

While illustrated as an internal component of computing device 210, UIC 212 may also represent an external component that shares a data path with computing device 210 for transmitting and/or receiving input and output. For instance, in one example, UIC 212 represents a built-in component of computing device 210 located within and physically connected to the external packaging of computing device 210 (e.g., a screen on a mobile phone). In another example, UIC 212 represents an external component of computing device 210 located outside and physically separated from the packaging or housing of computing device 210 (e.g., a monitor, a projector, etc. that shares a wired and/or wireless data path with computing device 210).

One or more storage components 248 within computing device 210 may store information for processing during operation of computing device 210 (e.g., computing device 210 may store data, such as address book 229A and spam list 229B, accessed by modules 220, 222, 224, 226, 228 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with address book 229A, spam list 229B, and modules 220, 222, 224, 226, and 228. Storage components 248 may include a memory configured to store data or other information associated with address book 229A, spam list 229B, and modules 220, 222, 224, 226, and 228.

One or more processors 240 may implement functionality and/or execute instructions associated with computing device 210. Examples of processors 240 include application processors, display controllers, auxiliary processors, one or more sensor hubs, and any other hardware configure to function as a processor, a processing unit, or a processing device. Modules 220, 222, 224, 226, and 228 may be operable by processors 240 to perform various actions, operations, or functions of computing device 210. For example, processors 240 of computing device 210 may retrieve and execute instructions stored by storage components 248 that cause processors 240 to perform the operations described herein that are attributed to modules 220, 222, 224, 226, and 228. The instructions, when executed by processors 240, may cause computing device 210 to store information within storage components 248, such as at address book 229A and spam list 229B.

Telephone module 222 may include all functionality of telephone module 122 of computing device 110 of FIG. 1 and may perform similar operations as telephone module 122 for handling direct, synchronous voice communications and other telephone related tasks on behalf of computing device 210. Sometimes referred to as a dialer or "dialer application" telephone module 222 interacts with CSS module 220 and in response to an instruction from CSS module 220 about accepting an incoming telephone call that has been vetted by CSS module 220 and a user of computing device 210, telephone module 222 may perform telephone related tasks to establish a direct voice communication session over the telephone call between the caller and the user. Telephone module 222 may provide an application programming interface (API) for receiving inputs and providing outputs to the various components of computing device 210, including CSS module 220.

The API of telephone module 222 may receive one or more commands that when received, cause telephone module 222 to establish a direct, synchronous telephone voice session between computing device 210 and another device. For example, in response to CSS module 220 determining that a user of computing device 210 would like to speak directly to a caller from another device, e.g., as part of a telephone call, CSS module 220 may issue, via the API, a command to telephone module 222 that causes telephone module 222 to take over for CSS module 220 to manage the telephone call. Whereas, in response to CSS module 220 determining that the user would not like to speak directly to the caller (for any reason), telephone module 222 may be commanded (e.g., via the API) from managing the telephone call.

Address book 229A represents a data store for holding contact information, including e-mail addresses, phone numbers, birthdays, addresses, and the like of contacts of a user of computing device 210. Modules 220, 222, 224, 226, and 228 may query address book 229A for a stored contact and in response, receive an indication of contact information associated with the stored contact. In some cases, address book 229A may be stored remotely, in a cloud computing environment (e.g., computing system 160) that modules 220, 222, 224, 226, and 228 access via a network, such as network 130. For instance, caller classifier module 226 may query address book 229A for a particular phone number of an incoming caller, as one example, to classify the caller as "known" or "unknown".

Spam list 229B represents a data store for holding telephone numbers of previous callers that have been flagged as malicious, solicitations, etc. Like address book 229A, modules 220, 222, 224, 226, and 228 may query spam list 229B for a telephone number and in response, receive an indication of whether any spam entities are associated with the telephone number. For instance, caller classifier module 226 may query spam list 229B for a particular phone number of an incoming caller, as one example, to classify the caller as "spam" or "malicious".

Context module 226 may process and analyze contextual information associated with computing device 210. When requested by other components of computing device 210, context module 226 may output, to the requesting component, contextual information associated with computing device 210 or a user of computing device 210. For example, context module 226 is configured to collect and provide contextual information to CSS module 220 to enable CSS module 220 to manage a CSS that executes at computing device 210. In some cases, context module 226 may process contextual information to define a context of computing device 210 or a context of a user of computing device 210.

As used throughout the disclosure, the term "contextual information" refers to any conceivable information that may be used by a computing system and/or computing device, such as computing device 210, to provide a CSS in accordance with techniques described herein. Examples of contextual information may include: device location and/or sensory information, user topics of interest (e.g., a user's favorite "things" typically maintained as a user interest graph or some other type of data structure), contact information associated with users, such as a user's personal contact information as well as information about a user's friends, co-workers, social media connections, family, etc. (e.g., contained in address book 229A or in some other information source stored locally at storage components 248 or accessed remotely), search histories, location histories, long-term and short-term tasks, calendar information, application usage histories, purchase histories, items marked as favorites, electronic bookmarks, and other information that computing device 210 can gather about a user of computing device 210 from interactions with computing device 210 or other devices associated with the user.

Further examples of contextual information include information about the operating state of a computing device. For example, an application that is executed at a given time or in a particular location is an example of information about the operating state of a computing device. In some examples, the operating state may include an indication of whether a do not disturb setting is enabled, e.g., based on context or explicit user command. Other examples of contextual information that is indicative of an operating state of a computing device include, but are not limited to, positions of switches, battery levels, whether a device is plugged into a wall outlet or otherwise operably coupled to another device and/or machine, user authentication information (e.g., which user is currently authenticated-on or is the current user of the device), whether a device is operating in "airplane" mode, in standby mode, in full-power mode, the operational state of radios, communication units, input devices and output devices, etc.

In contrast to "contextual information" the term "context" refers to a particular state of each characteristic from a collection of characteristics associated with a computing device and/or a user of a computing device, at a particular time. The context may indicate characteristics associated with the physical and/or virtual environment of the user and/or the computing device at a particular location and/or time. As some examples, a context of a computing device may specify an acoustic fingerprint, a video fingerprint, a location, a movement trajectory, a direction, a speed, a name of a place, a street address, a type of place, a building, weather conditions, and traffic conditions, at various locations and times. As some additional examples, the context of a computing device may specify a calendar event, a meeting, or other event associated with a location or time.

In some examples, a context of a computing device may specify any webpage addresses accessed at a particular time, one or more text entries made in data fields of the webpages at particular times, including search or browsing histories, product purchases made at particular times, product wish lists, product registries, and other application usage data associated with various locations and times. The context of the computing device may further specify audio and/or video accessed by or being broadcast in the presence of the computing device at various locations and times, television or cable/satellite broadcasts accessed by or being broadcast in the presence the computing device at various locations and times, and information about other services accessed by the computing device at various locations and times.

When collecting, storing, and using contextual information or any other user or device data, computing device 210 takes precautions to ensure that user privacy is preserved. That is, computing device 210 may only collect, store, and analyze contextual information if computing device 210 receives explicit permission of individual users from which the contextual information originates. For example, in situations in which computing device 210 may collect information for providing an example CSS, a user of computing device 210 may be provided with an opportunity to provide input to control whether computing device 210 can collect and make use of their information. The individual users may further be provided with an opportunity to control what computing device 210 can or cannot do with the information.

Any data being collected by computing device 210 may be pre-treated in one or more ways before it is transferred to, stored by, or otherwise used by computing device 210, so that personally-identifiable information is removed. For example, before computing device 210 collects contextual information computing device 210 may pre-treat the contextual information to ensure that any user identifying information or device identifying information embedded in the contextual information is removed before being stored by computing device 210 or transferred to an external computing device or system. The user has complete control over whether contextual information is collected, and if so, how such information may be used by computing device 210.

CSS module 220 may include all functionality of CSS module 120 of computing device 110 of FIG. 1 and may perform similar operations as CSS module 120 for managing a CSS that executes at computing device 210. CSS module 220 of computing device 210 causes computing device 210 to presents a CSS user interface, such as CSS user interface 114, from which a user of computing device 210 can interact with the CSS managed by CSS module 220.

Flow manager module 226 of CSS module 220 controls the overall operations of the CSS and the CSS user interface provided by CSS module 220. Flow manager module 226 may perform a variety of functions on behalf of CSS module 220 for providing an example CSS including: directing an interrogation between CSS module 220 and a caller, translating user inputs associated with the CSS user interface into spoken utterances that CSS module 220 conveys to the caller, interpreting user inputs to perform an action related to an incoming telephone call (e.g., terminate the telephone call, hand over responsibility to telephone module 222 to manage direct communication between a user of computing device 210 and a caller), as well as other operations.

Flow manager module 226 may classify incoming calls that have been intercepted by CSS module 220 and use the caller classification to provide a tailored CSS to handle the specific classification. In other words, flow manager module 226 may classify a caller as being a particular type of caller from a plurality of caller types. Flow manager module 226 may adapt, based on the particular type of caller, the audio user interface established via the telephone call that CSS module 220 uses to interrogate the caller. Flow manager module 226 may adapt the audio user interface to obtain additional information needed to produce a CSS user interface, such as CSS user interface 114, that is specific for the particular type of caller. That is, flow manager module 226 may reconfigure the audio user interface to obtain a specific type of information from certain types of caller and may expect to obtain different information from other types of callers.

Flow manager module 226 may classify a caller as being unknown, spam, business, professional contact, personal contact, favorites, as well as many other ways. For example, in response to performing a lookup, within address book 229A or spam list 229B, of a telephone number or name associated with an incoming telephone call, flow manager module 226 may classify a caller of the incoming telephone call as being a known contact when found in address book 229A, or a spam caller if found in spam list 229B.

For known callers, flow manager module 226 may classify callers as personal contacts when the incoming telephone number appears in a personal directory of address book 229A. Flow manager module 226 may classify known callers as professional contacts when the incoming telephone number appears in a professional directory of address book 229A. Similarly, for known callers, flow manager module 226 may classify callers as favorites when the incoming telephone number appears in a favorites directory of address book 229A.

In response to not identifying an incoming telephone number or caller within address book 229A or spam list 229B, flow manager module 226 may determine whether a caller can be classified as a business, government, organization, or other non-human entity. In some examples, flow manager module 226 may classify known callers as non-human entities when the incoming telephone number does not appear within address book 229A or spam list 229B, but matches a telephone number listed in a business, government, organization, or other non-human entity database. For example, with access to a remote computing system, such as computing system 160 of FIG. 1, or some other system accessible via a network, such as network 130, flow manager module 226 may conduct a search for an incoming telephone number. Flow manager module 226 may classify an incoming telephone number as a non-human entity when the search matches an incoming telephone number to a non-human listing in a maps database or business directory (e.g., a maps or business directory that is accessible on the internet).

Flow manager module 262 may rely on a machine-learning (ML) model to classify a caller. For example, a ML model of flow manager module 262 may predict use rules developed from observations of past behavior of a user of computing device 210 and users of other devices when classifying a caller. The ML model may be trained based on based on past phone calls between one or more computing devices, including but not limited to computing device 210 to learn over time and make predictions about a caller's identity as well as a likely purpose for an incoming telephone call. The ML model may be further trained based on the observations of past user behavior to determine what action a user is likely to want to take in response to an incoming call. For instance, on one hand, if a user or other similar users typically ignore a call from a particular caller, the ML model may establish a rule that whenever a telephone call originates from the particular caller to classify the caller as spam even though the caller may or may not be included in spam list 229B. On the other hand, if a user of computing device 210 never ignores a call from a particular caller (e.g., a spouse, parent, doctor, etc.) the ML model may establish a rule that whenever a telephone call originates from the particular caller to bypass classifying the caller and instead task telephone module 222 for handling the incoming call. Many other classification rules are possible for classifying callers based on learned behavior regarding how a user of computing device 210 or users of other computing devices treat incoming calls.

In addition to relying on an incoming telephone number or other caller identification related information conveyed in a typical telephone call, flow manager module 226 may rely on supplemental, non-telephone related data or data other than what's in address book 229A or spam list 229B as input to a ML model to classify a call. For example, context module 224 may provide contextual information or an indication of a current context associated with computing device 210 to a ML model of flow manager module 226 to classify a caller. Flow manager module 226 is shown in FIG. 2 having an optional "ML model". In some examples, the ML model executes within flow manager module 226 and in other example, the ML model may execute outside flow manager module 226 either locally at computing device 210 or remotely at computing system 160 and accessible via a network, such as network 130.

As one example, while other users of other devices may classify a particular caller or telephone number as spam, to some users, such calls may be desirable, particularly if a user has an interest in what the caller is selling, asking, or inquiring about. For example, context module 224 may determine from past purchase histories of a user that the user recently subscribed to an online or satellite radio service. Context module 224 may provide the past purchase information to flow manager module 226 for input into the ML model. At some point, the user may interact with computing device 210 to call about an issue with the service and after being placed on hold, the user may request a call-back. While some other users typically ignore calls from the radio service (because often times the caller is trying to push an unwanted sale), the user of computing device 210 may wish to receive a call from the radio service as the caller is likely from the customer service department and returning the user's call. As such, rather than classify the caller as spam, the ML model of flow manager 226 may classify the caller as a business call and interrogate the caller to ensure the purpose of the call is for legitimate purposes.

In any event, whether using a ML model to classify a call or determine a mode of interrogation, the input data to such a ML model may include one or more features that are associated with an instance, a context, or an example. Given features associated with a particular context, the ML model of flow manager 226 can output a prediction for that context. For example, based on previous observed phone calls, the ML model of flow manager 226 may determine features of the previous observed phone calls, contextual information about the devices used to conduct the previous phone calls, etc. and generate rules for predicting the identity of a future caller, a purpose of a future call, and what information may be exchanged between a user and a future caller if the future caller calls computing device 210, given a similar context.

The ML model of flow manager 226 can be or include one or more of various different types of machine-learned models. In particular, in some implementations, the ML model of flow manager 226 can perform classification, regression, clustering, anomaly detection, recommendation generation, and/or other tasks. Examples of different types of machine-learned models include: classifier models such as, for example, linear classification models; quadratic classification models, and regression models such as, for example, simple linear regression models; multiple linear regression models; logistic regression models; stepwise regression models; multivariate adaptive regression splines; locally estimated scatterplot smoothing models; etc. Other types of models include decision tree-based models such as, for example, classification and/or regression trees; iterative dichotomize 3 decision trees; C4.5 decision trees; chi-squared automatic interaction detection decision trees; decision stumps; conditional decision trees; etc., kernel machines, support vector machines, and instance-based learning models such as, for example, learning vector quantization models; self-organizing map models; locally weighted learning models; etc. In some implementations, the ML model of flow manager 226 can be or include one or more nearest neighbor models such as, for example, k-nearest neighbor classifications models; k-nearest neighbors regression models; etc., Bayesian models such as, for example, naïve Bayes models; Gaussian naïve Bayes models; multinomial naïve Bayes models; averaged one-dependence estimators; Bayesian networks; Bayesian belief networks; hidden Markov models; etc.

In some implementations, the ML model of flow manager 226 can be or include one or more artificial neural networks (also referred to simply as neural networks) including neural networks that include multiple layers, or so called "deep" networks, feed forward networks, recurrent neural networks including long short-term (LSTM) recurrent neural networks; gated recurrent units; bi-direction recurrent neural networks; continuous time recurrent neural networks; neural history compressors; echo state networks; Elman networks; Jordan networks; recursive neural networks; Hopfield networks; fully recurrent networks; sequence-to-sequence configurations; etc. In some implementations, the ML model of flow manager 226 can be or include one or more convolutional neural networks, generative networks such as, for example, generative adversarial or other forms of artificial neural networks such as, for example, deep Boltzmann machines; deep belief networks; stacked autoencoders; etc. Any of the neural networks described herein can be combined (e.g., stacked) to form more complex networks.

Speech engine module 228 of CSS module 220 is responsible for performing text-to-speech (TTS) and speech-to-text (STT) translations on behalf of CSS module 220. Speech engine module 228 may be adapted from an existing speech engine, such as a voice generator for a virtual assistant or a speech engine used to assist those with auditory or speech impediments. Unlike other speech engines though, speech engine module 228 is specifically adapted for understanding lower quality audio sounds than other speech engines may have difficulty processing. In addition, speech engine module 228 is modified to output spoken audio that can clearly be understood over a telephone connection.

Speech engine module 228 may transcribe, into text, anything that a caller speaks during an incoming telephone call. Speech engine module 228 may feed the transcribed text to flow manager module 226 for inclusion in a CSS user interface, such as CSS user interface 114. In some examples, speech engine module 228 may be adapted to understand and transcribe spoken voice input received in a variety of human languages. For example, speech engine module 228 may receive a spoken input in a first language (e.g., Mandarin) and transcribe the spoken input into text written in a second language (e.g., English). In this way, speech engine module 228 may enable asynchronous communication between a user of computing device 210 and a caller, in cases where the user and the caller speak different languages.

By relying on context module 224, flow manager module 226, and speech engine module 228, CSS module 220 may a customized CSS that is tailored for a particular context and for a particular classification of caller. For example, as indicated above, any interaction options (e.g., graphical elements 118 of FIG. 1) included in a CSS user interface provided by CSS module 220 may change based on context and caller classification. That is, actions or response options associated with a CSS user interface may be adjusted such that any associated actions or commands presented to the user will be appropriate to the classification of the caller and the context. For example, for callers that are classified as unknown, CSS module 220 may cause the CSS user interface to include a graphical element for marking a caller as spam, but for callers that are classified as known, CSS module 220 may cause the CSS user interface to omit such a graphical element.

In some examples, CSS module 220 may automatically bypass its CSS in response to determining that a caller or incoming telephone call has a characteristic that satisfies a criteria for sending the call through to telephone model 222 or for automatically blocking, ignoring, or handling a telephone call in a different way. CSS module 222 may handle a telephone call, based on contextual information, or characteristics of an incoming call.

For example, if a user is waiting for a callback from a particular caller (e.g., as determined by CSS module 220 based on information contained in a user's e-mail, voice-mail, or other messages, CSS module 220 may refrain from interrogating a caller and instead send a telephone call through to telephone module 222. In addition, or alternatively, CSS module 220 may refrain from interrogating a caller and instead send a telephone call through to telephone module 222 in response to determining that a caller is on a whitelist, favorites list, or address book 229A. In some examples, CSS module 220 may deduced a caller is a friend and immediately put the person through without interrogation. A user may be given an option to interrogate acquaintances (or those callers who call infrequently) close friends are put through, acquaintances are given an option to be put through or receive a different, more personal and friendly kind of interrogation, than the type of interrogation performed on strangers (who may never or rarely be put through).

CSS module 220 may determine a sentiment of a caller to determine whether to interrogate, bypass an interrogation, or block an incoming call. For example, CSS module 220 may determine a caller's responses to include tonal inflections, words, or other qualities that cause ML model of CSS module 220 to classify a caller according to a particular emotional state and handle a call accordingly. For instance, an angry caller may never be passed on to a user and always either sent to voicemail or blocked. A pleasant caller, even if unknown, may be interrogated and eventually passed on to the user.

CSS module 220 may determine a language of a caller to determine whether how best to interrogate a caller. For example, in response to receiving spoken audio input from a caller, CSS module 220 may determine words in the spoken audio input correspond to words of a language that is different than a user's normal language and instead of communicating with the caller using the user's language, CSS module 220 may communicate with the caller in the language of the spoken audio input. an incoming call. In some cases, CSS module 220 may automatically translate a caller's spoken responses during an interrogation into a user's preferred language.

CSS module 220 may determine a language of a caller to determine whether to interrogate, bypass an interrogation, or block an incoming call. For example, in response to receiving spoken audio input from a caller, CSS module 220 may determine words in the spoken audio input correspond to words of a language that is foreign to a user's normal language. CSS module 220 may infer that because the language of the caller is different than the user's normal language that the telephone call may be unsolicited and unrequested and immediately send the telephone call to voicemail. Such a feature may be particularly useful when a user is visiting jurisdictions and geographical regions in which spam calls (originating by callers who speak a native language that is different than the user's native language) are more frequent.

In some examples, CSS module 220 may determine a caller's identity based on voice-recognition of the caller's speaking voice. For example, the caller's speaking voice may match a voice print stored at address book 229A or otherwise accessible to CSS module 220. In this way, a caller can be classified as a known or favorite caller and be treated accordingly.

In some examples, CSS module 220 may determine a caller's identity to be a robot or non-human caller based on voice-recognition of the caller's speaking voice relative to known non-human or robotic speaking voices. For example, the caller's speaking voice may match a voice print of a robot or non-human entity. In this way, a caller can be classified as a robot and treated accordingly.

In some examples, CSS module 220 may perform different actions or handle an interrogation in a different way with a human caller than with a non-human caller. For instance, in response to recognizing a robot as a caller, CSS module 220 may communicate with the robot using non-human understandable, audible queues, or in some other way to determine the purpose of the robot's call. In some examples, in response to recognizing a robot caller, CSS module 220 may immediately hang-up the call.

FIGS. 3A-3E are conceptual diagrams illustrating screenshots of an example call screening service user interface of an example computing device that executes a call screening service, in accordance with one or more aspects of the present disclosure. FIGS. 3F-3I are conceptual diagrams illustrating screenshots of another example call screening service user interface of an example computing device that executes a call screening service, in accordance with one or more aspects of the present disclosure.

For ease of description, the example call screening user interfaces of FIGS. 3A through 3I are described in the context of computing device 210 of FIG. 2 and system 100 of FIG. 1. For example, FIG. 3A includes user interface 314A. Flow manager 226 of CSS module 220 of computing device 210 may cause UIC 212 to output user interface 314A in response to computing device 210 receiving an incoming call. In the example of FIGS. 3A through 3E, computing device 210 receives an incoming call from an unknown caller and the other example of FIGS. 3F through 3I computing device 210 receives an incoming call from a known caller.

Figure 3A:
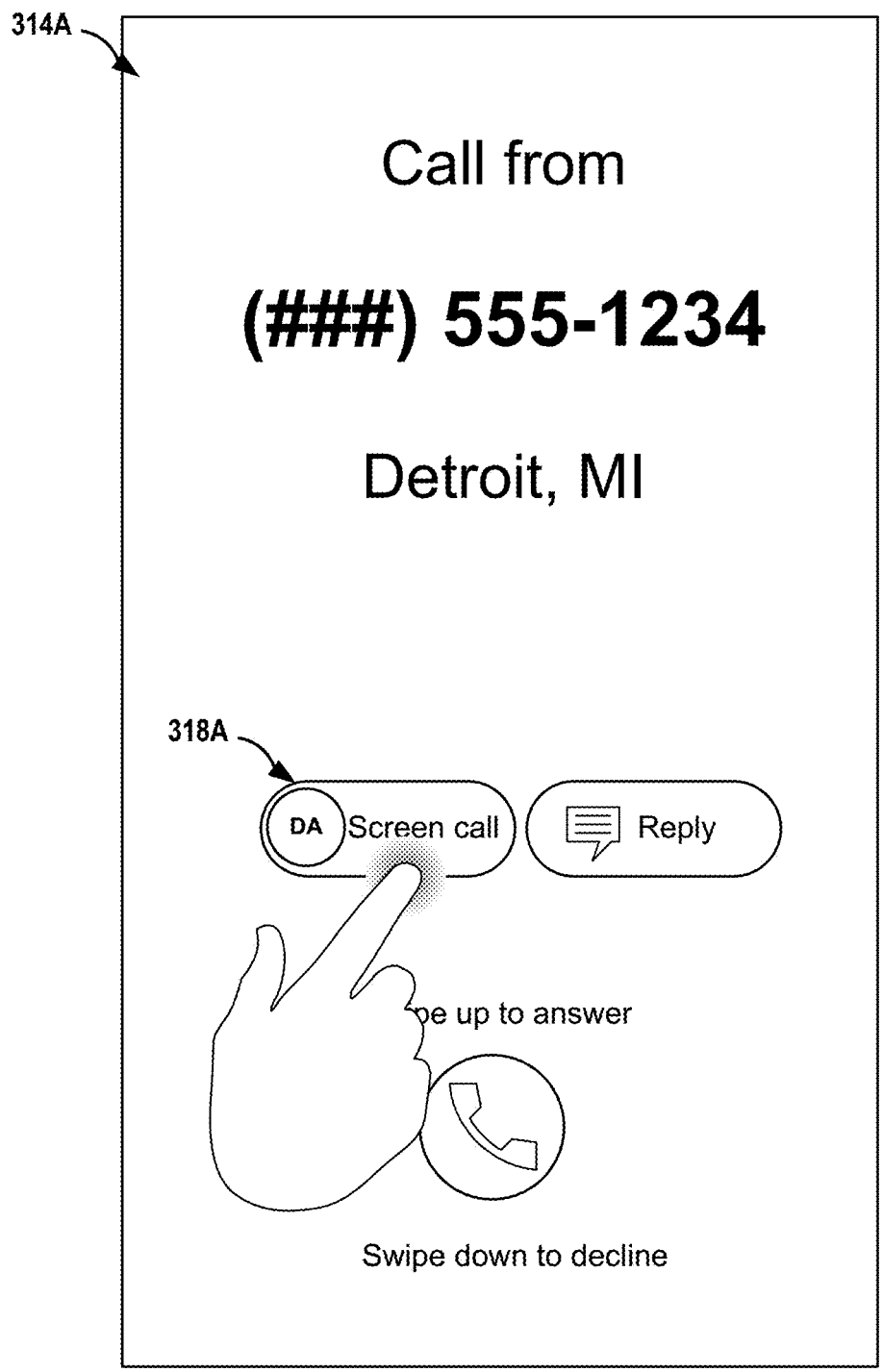
FIGS. 3A-3E are conceptual diagrams illustrating screenshots of an example call screening service user interface of an example computing device that executes a call screening service, in accordance with one or more aspects of the present disclosure.

FIG. 3A includes user interface 314A as an example CSS user interface. In response to an incoming call, flow manager 226 of CSS module 220 may cause UIC 212 to present user interface 314 from which a user of computing device 210 is provided with several options for handling the incoming call, including answering the call, replying by message, and screening the call. In response to selecting graphical element 318A, flow manager 226 of CSS module 220 may interpret the user selection of graphical element 318A as a command to interrogate the caller before passing the incoming call to telephone module 222 for further processing.

Figure 3B:
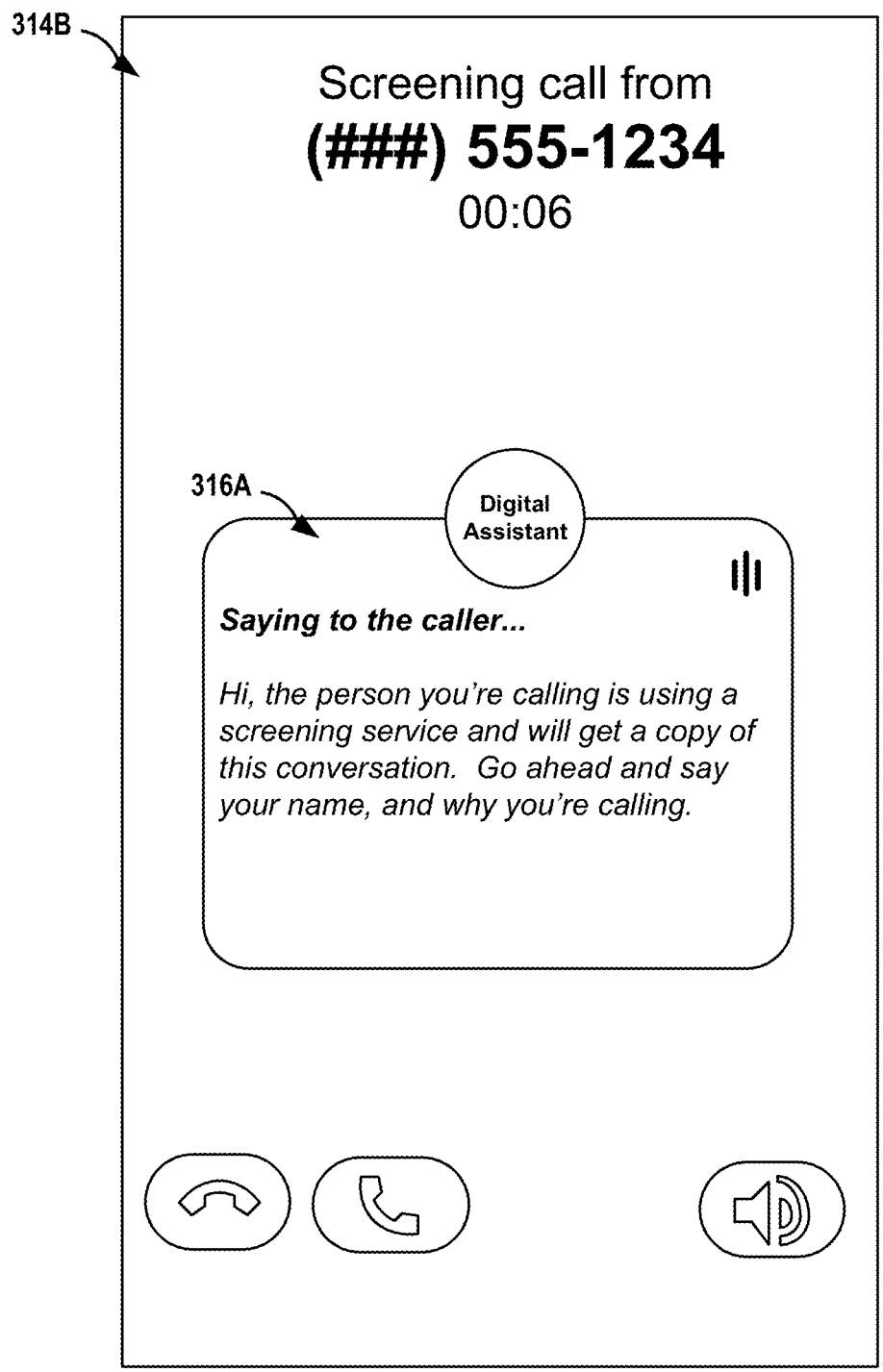

FIG. 3B includes user interface 314B. Flow manager 226 of CSS module 220 may cause UIC 212 to display user interface 314B in response to detecting a selection of graphical element 318A of user interface 314A. That is, before answering an incoming telephone call, flow manager 226 of CSS module 220 may determine, based on user input or automatically based on contextual information from context module 224 or a prediction made by a ML model of flow manager 226, that the user would prefer to screen the caller before speaking to him or her directly over the telephone connection. Flow manager 226 of CSS module 220 may cause UIC 212 to include graphical element 316A which includes a transcription of the spoken audio that speech engine 228 of CSS module 220 is outputting over the telephone connection.

Figure 3C:
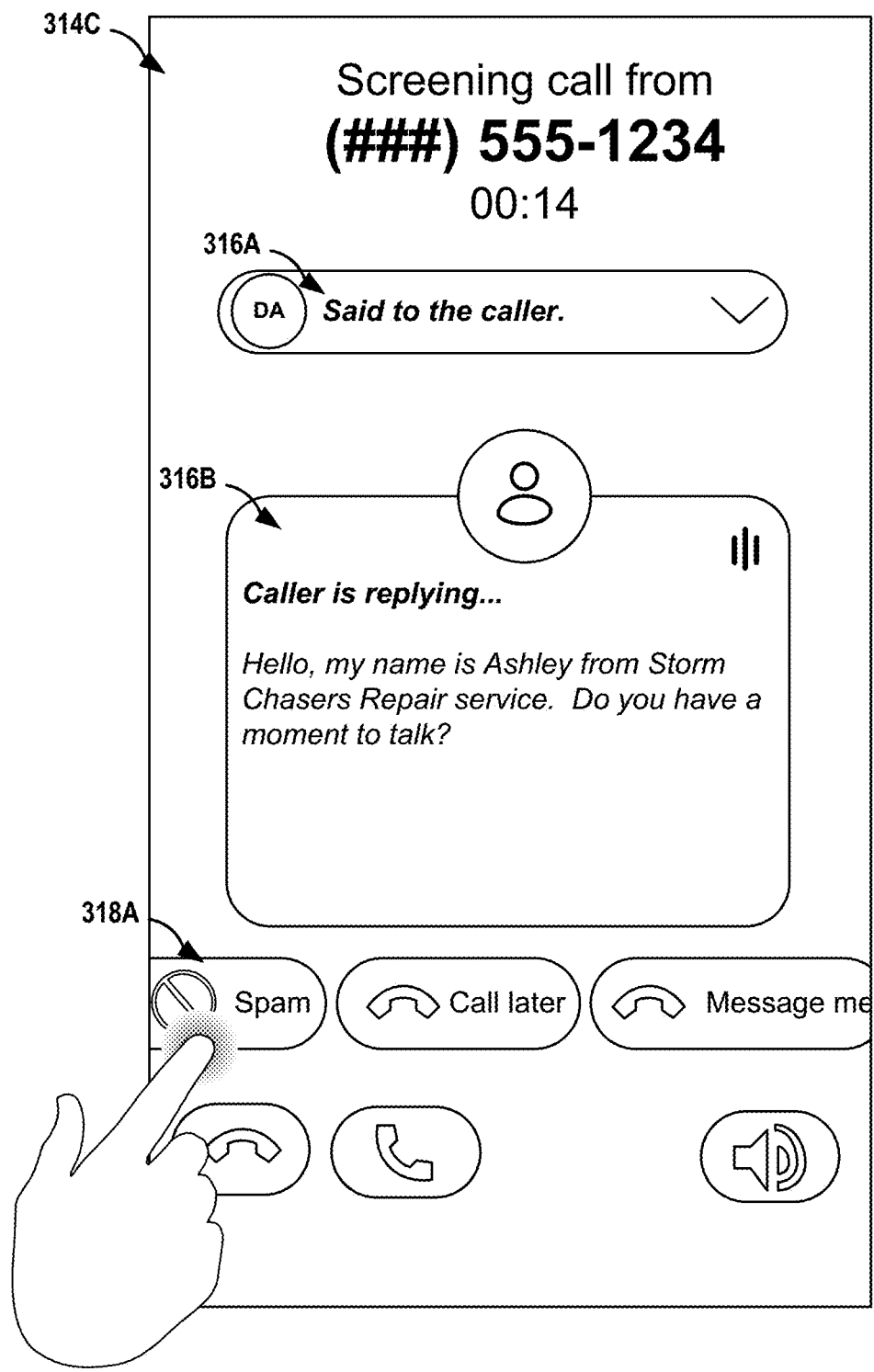

FIG. 3C includes user interface 314C. Also Flow manager 226 may classify the caller as an unknown caller as the telephone number of the incoming call may not appear in address book 229A or spam list 229B. In response to not identifying the telephone number in any business listings or directories either, the ML model of flow manager 226 may classify the caller as a potential spam caller and cause flow manager 226 to output graphical element 316B which includes a transcription of the spoken request made over the telephone connection, by speech engine module 228, for basic information including the caller's name and purpose of the call.

Based on the classification, flow manager 226 may include within user interface 314C one or more graphical elements for commanding speech engine module 228 to output a specific response or a specific question that is specific to the classification. For example, in response to flagging an incoming call as possible spam, flow manager module 226 may include graphical element 318A so that a user of computing device 210, in response to reading the transcription in graphical element 316B, may select graphical element 318A to add the caller to spam list 229B and then terminate the call.

Figure 3D:
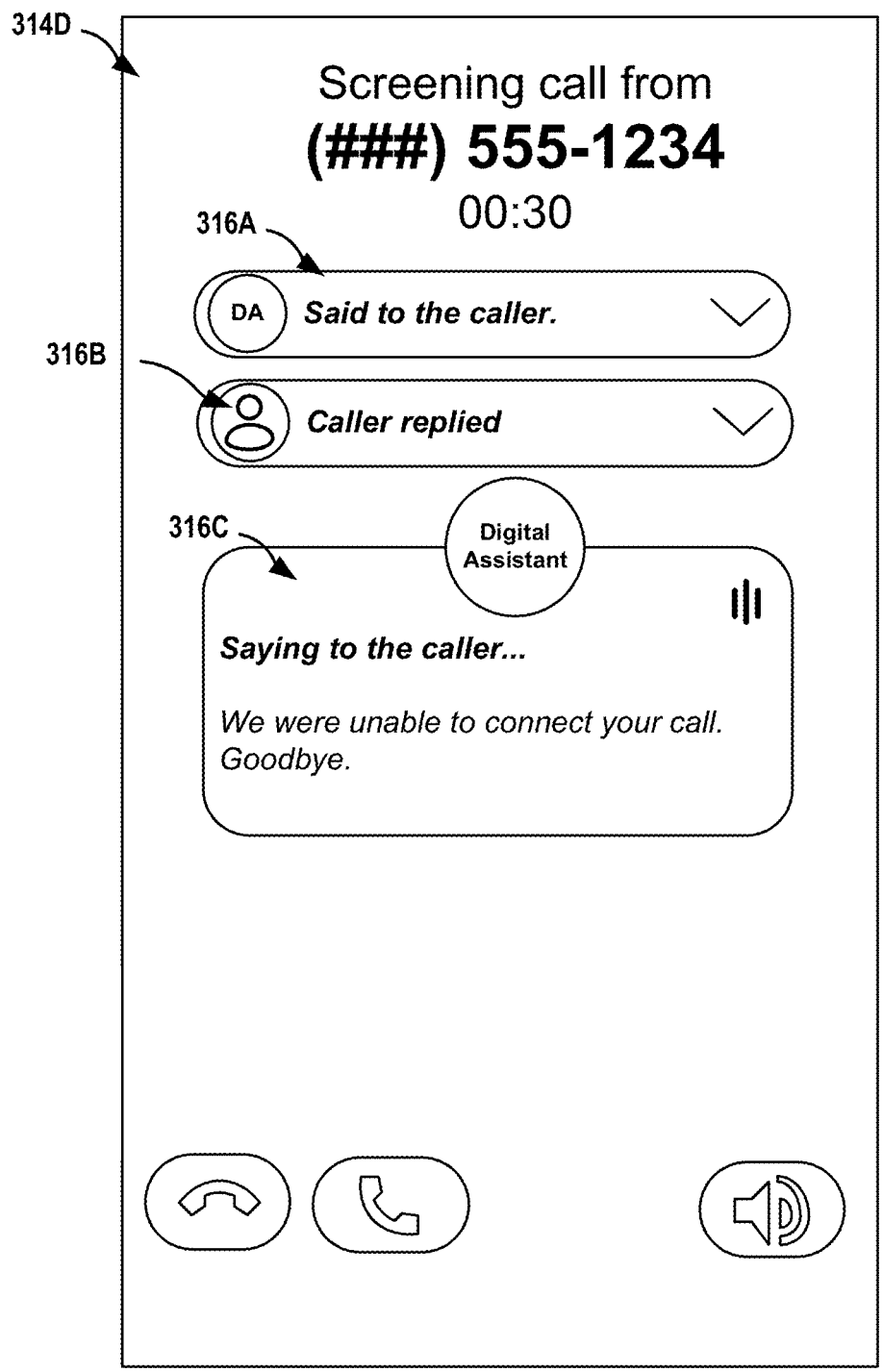

FIG. 3D includes user interface 314D. In response to a user command to accept or reject the telephone call, CSS module 220 may terminate the audio user interface established over the telephone call. CSS module 220 may accept the telephone call by speaking to the caller "Hang on while I connect you" and passing control to telephone module 222 for enabling direct voice communication, via the telephone call, between the user and the caller. CSS module 220 may reject the telephone call by hanging up after speaking to the caller "We were unable to connect your call. Goodbye." while causing user interface 314D to include a copy of the hangup.

Figure 3E:
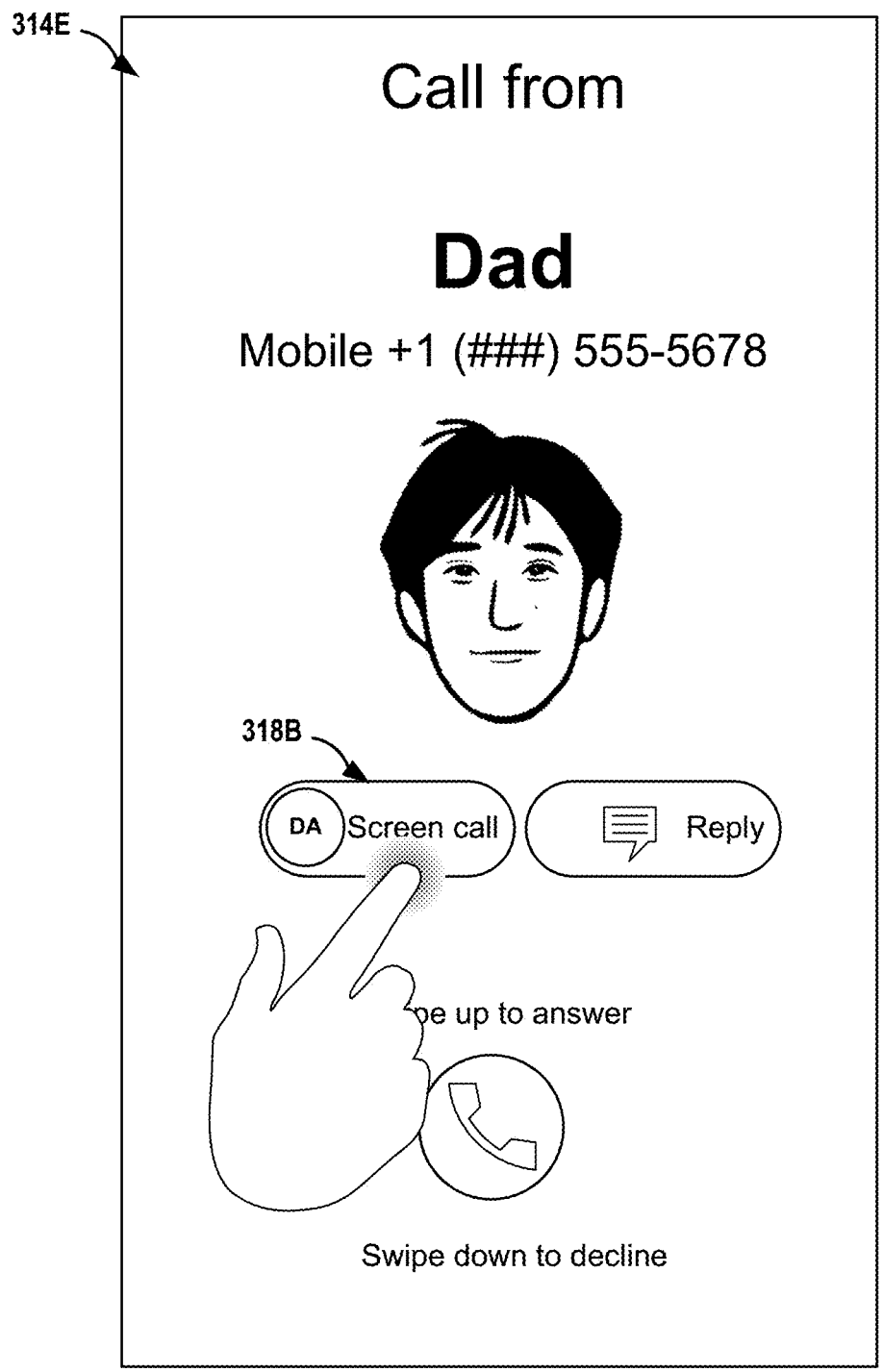

Turning now to an example where CSS module 220 interrogates a known caller. FIG. 3E includes user interface 314E as an example CSS user interface. In response to an incoming call, flow manager 226 of CSS module 220 may cause UIC 212 to present user interface 314E from which a user of computing device 210 is provided with several options for handling the incoming call, including answering the call, replying by message, and screening the call. In response to selecting graphical element 318B, flow manager 226 of CSS module 220 may interpret the user selection of graphical element 318B as a command to interrogate the caller before passing the incoming call to telephone module 222 for further processing.

Figure 3F:
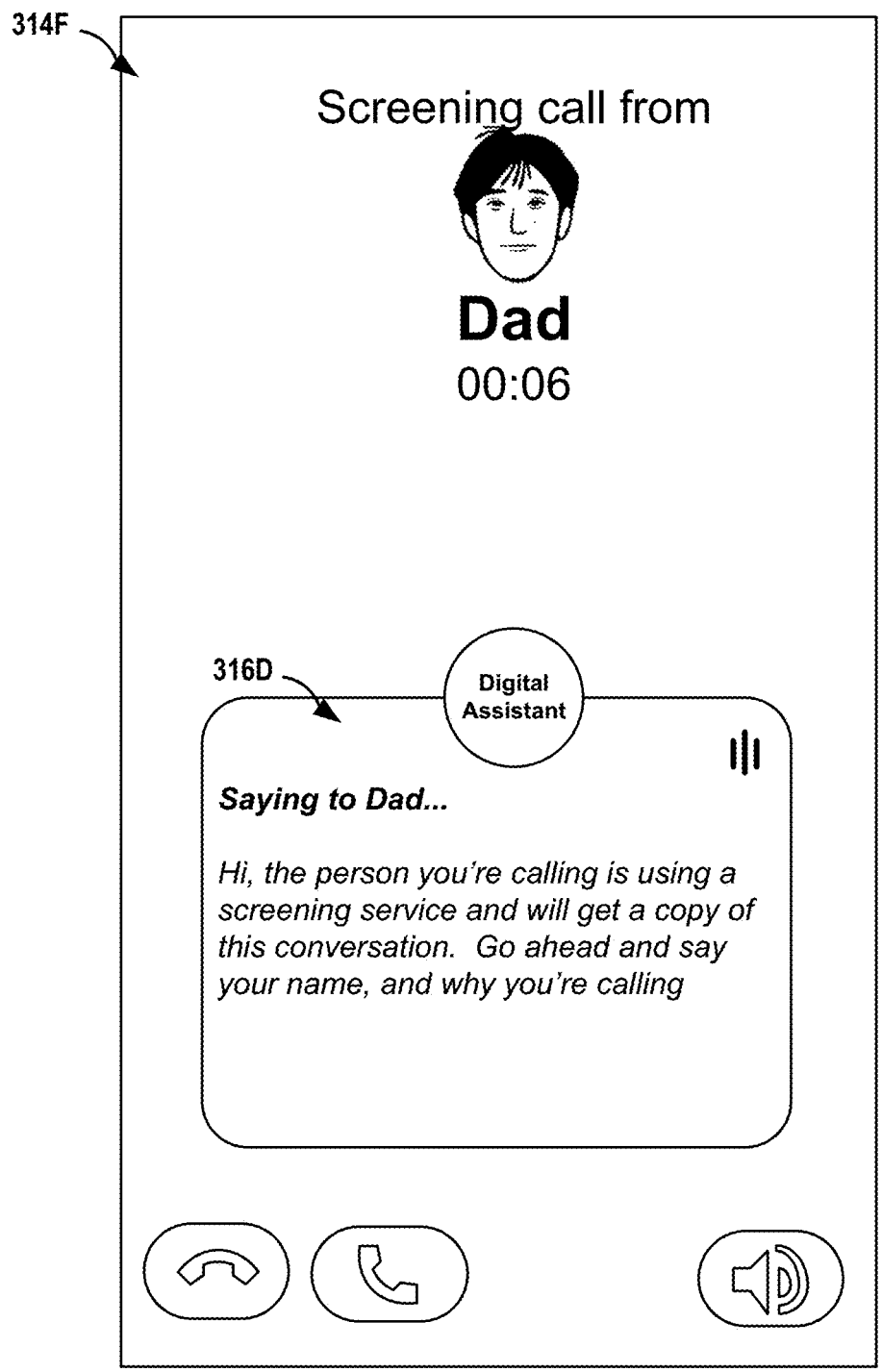
FIGS. 3F-3I are conceptual diagrams illustrating screenshots of another example call screening service user interface of an example computing device that executes a call screening service, in accordance with one or more aspects of the present disclosure.

FIG. 3F includes user interface 314F. Flow manager 226 of CSS module 220 may cause UIC 212 to display user interface 314F in response to detecting a selection of graphical element 318B of user interface 314E. That is, before answering an incoming telephone call, flow manager 226 of CSS module 220 may determine, based on user input or automatically based on contextual information from context module 224 or a prediction made by a ML model of flow manager 226, that the user would prefer to screen the caller before speaking to him or her directly over the telephone connection. Flow manager 226 of CSS module 220 may cause UIC 212 to include graphical element 316D which includes a transcription of the spoken audio that speech engine 228 of CSS module 220 is outputting over the telephone connection.

Figure 3G:
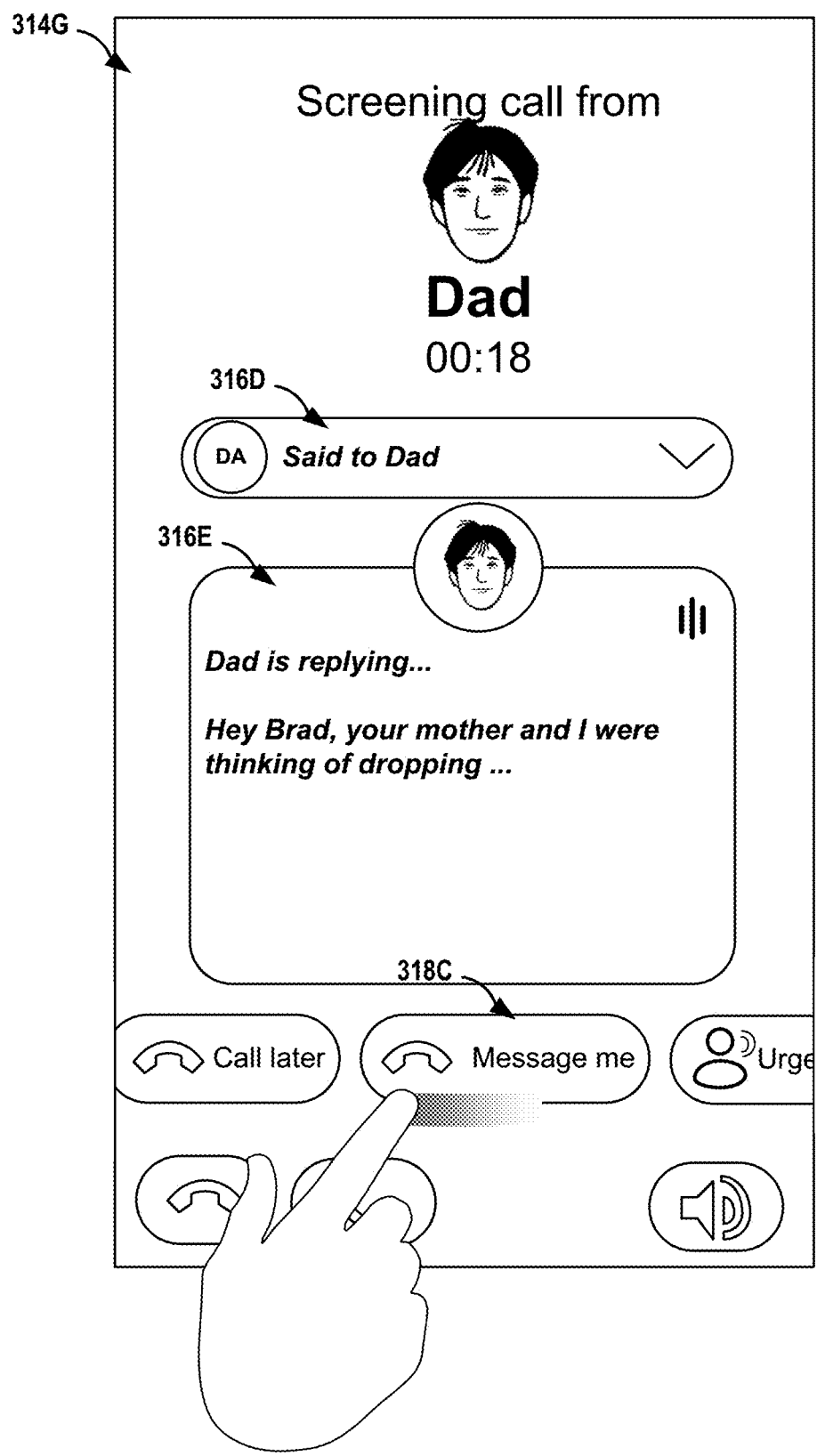

FIG. 3G includes user interface 314G. CSS module 220 may include graphical element 316E which shows a transcription of the spoken audio being captured by speech engine module 229 as the caller provides the additional information requested by the user (i.e., the purpose of the call).

Flow manager 226 may classify the caller as a known caller as the telephone number of the incoming call may appear in address book 229A under a listing for "Dad". In response to identifying the telephone number in address book 229A, the ML model of flow manager 226 may classify the caller as a personal contact and cause flow manager 226 to output graphical element 316D which includes a transcription of the spoken request made over the telephone connection, by speech engine module 228, which forgoes the request for basic information including the caller's name, and instead addresses the caller by name and asks for the purpose of the call.

Based on the classification, flow manager 226 may include within user interface 314G, one or more graphical elements for commanding speech engine module 228 to output a specific response or a specific question that is specific to the classification. For example, in response to flagging an incoming call as being from a known caller, flow manager module 226 may refrain from including graphical element 318A as the known caller is not a spammer. Instead, flow manager module 226 may include other graphical elements associated with specific questions, commands, or actions that a user may which to have computing device 210 perform in response to receiving an incoming telephone call from a known caller.

As shown in FIG. 3G, a user may provide a specific input (e.g., a force input, a swipe gesture, or other input) at or near a location of user interface 314G at which the graphical elements associated with specific questions, commands, or actions that a user may which to have computing device 210 perform in response to receiving an incoming telephone call from a known caller are displayed. For example, user interface 314G includes graphical element 118C which is associated with a specific response to have the caller message the user of computing device 210 since the user cannot answer at the moment.

Figure 3H:
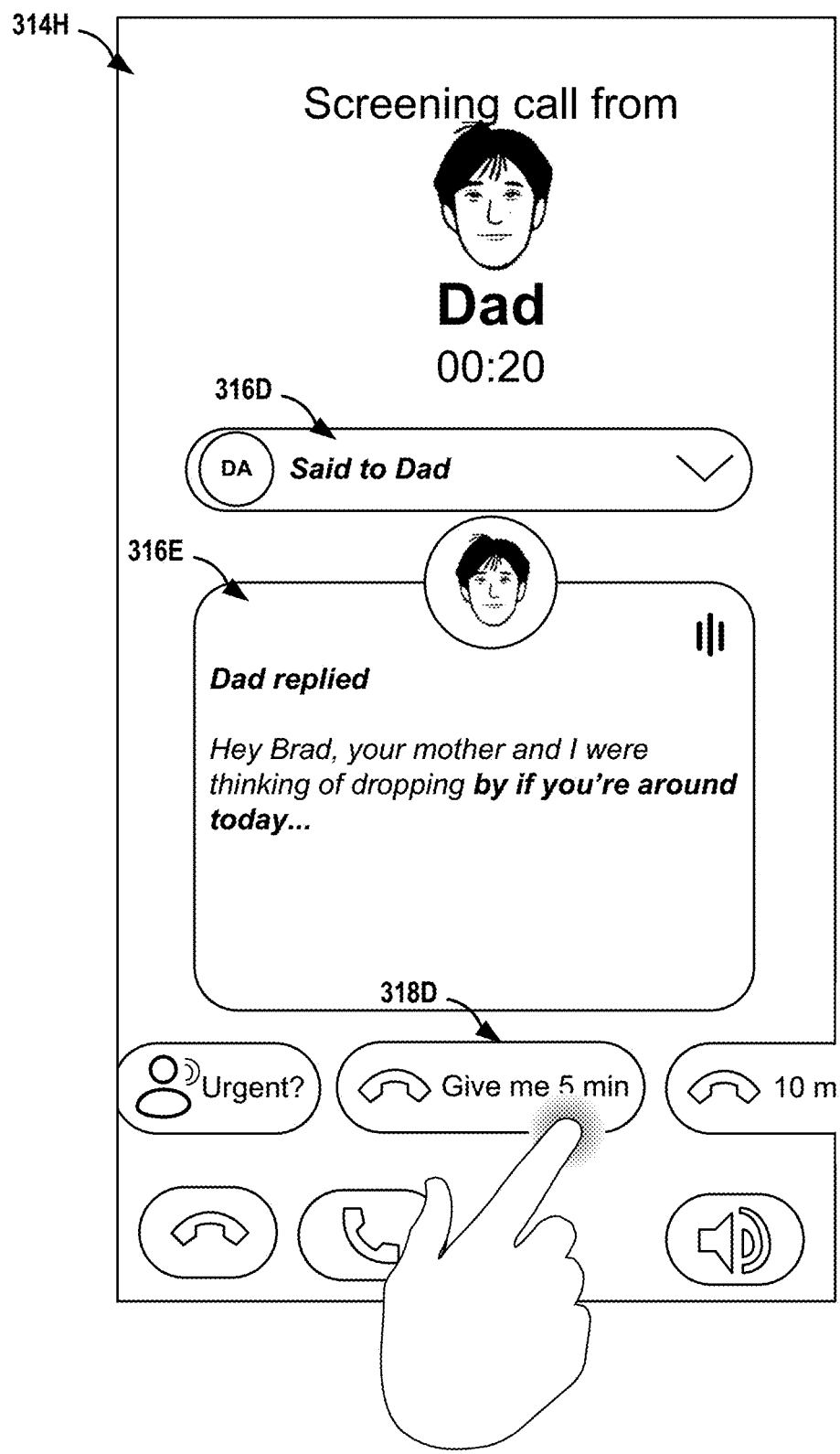

FIG. 3H includes user interface 314H. In response to the user input at graphical element 118C, CSS module 220 may cause UIC 212 to display user interface 314H including graphical element 318D as an additional graphical element associated with a specific question, command, or actions that a user may wish to have computing device 210 execute in response to receiving an incoming telephone call from a known caller. CSS module 220 may update the transcription included in graphical element 316E as the caller continues to provide the additional information requested by the user.

Figure 3I:
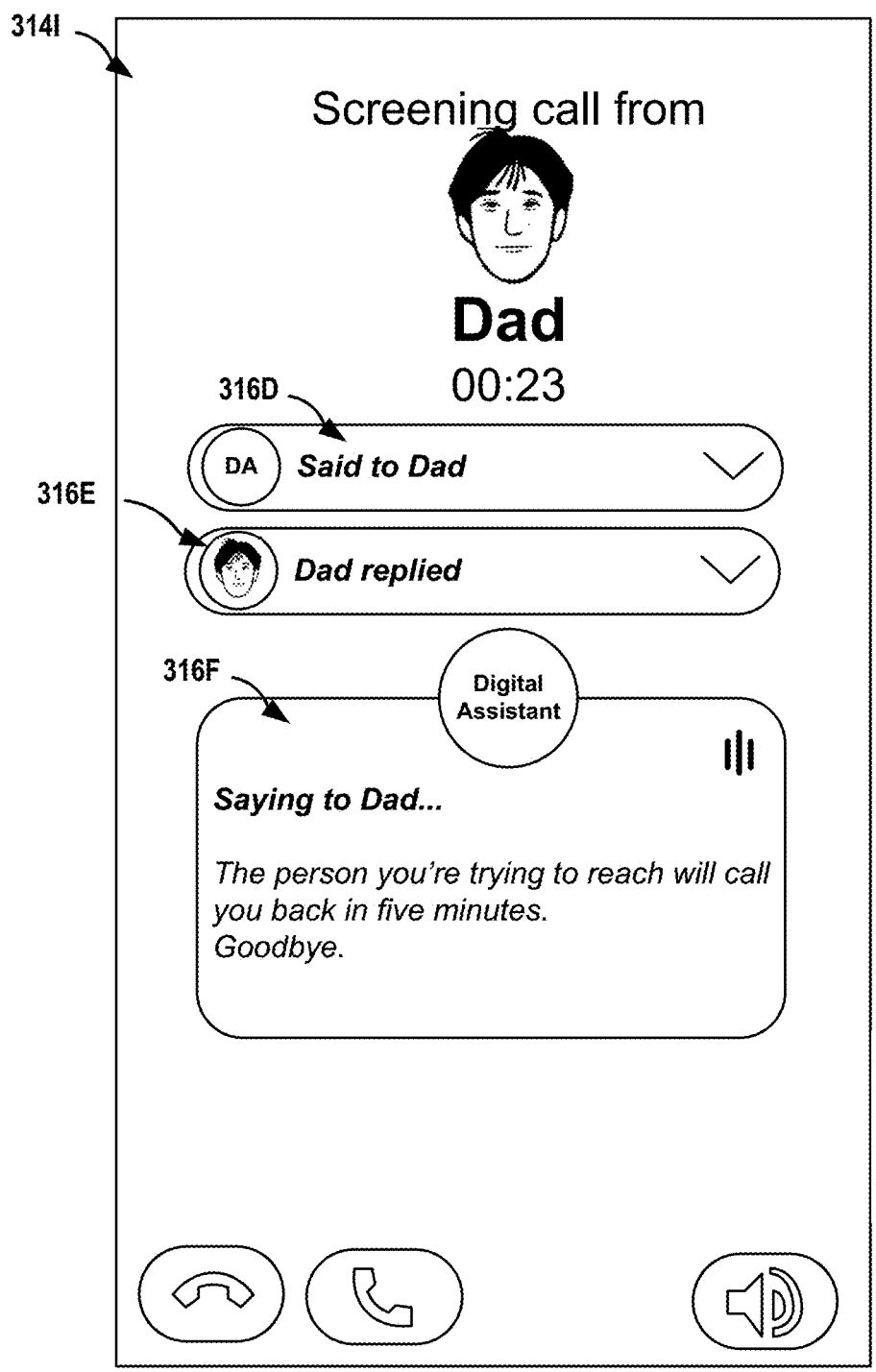

FIG. 3I includes user interface 314I. In response to a user command to accept or reject the telephone call, CSS module 220 may terminate the audio user interface established over the telephone call and either terminate the telephone call or pass control to telephone module 222 for enabling direct voice communication, via the telephone call, between the user and the caller. For example, CSS module 220, in response to a user input selecting graphical element 318D, and as shown in FIG. 3I, CSS module 220 may cause user interface 314I to include graphical element 316F which includes a transcription of the audio spoken by speech engine module 228 as CSS module 220 terminates the telephone all letting the caller know to expect a return call in five minutes.

Figure 4:
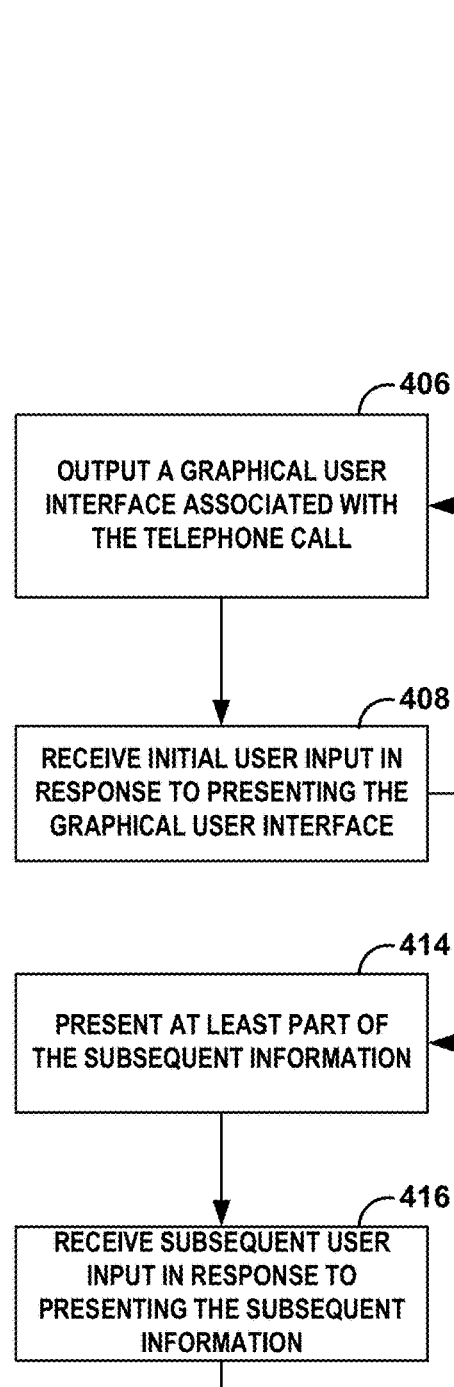
FIG. 4 is a flowchart illustrating example operations performed by an example computing device that executes a call screening service, in accordance with one or more aspects of the present disclosure.
Figure 4:
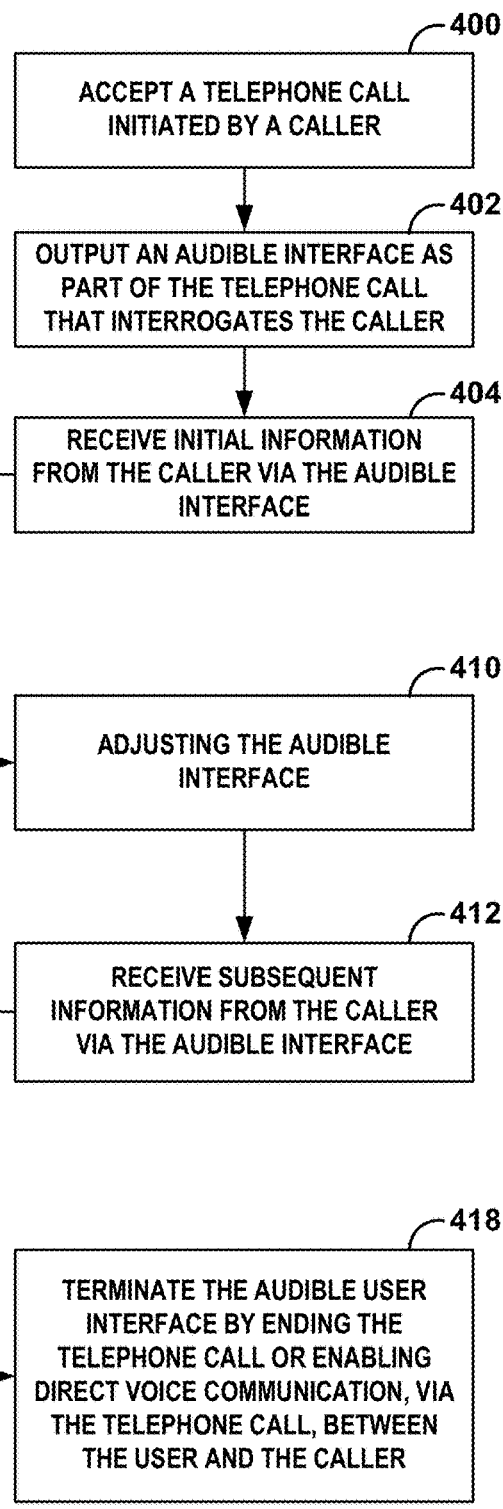

FIG. 4 is a flowchart illustrating example operations performed by an example computing device that executes a call screening service, in accordance with one or more aspects of the present disclosure. For example, operations 400 through 418 may be performed in by computing device 210, computing device 110, computing system 160, or a combination of computing device 110 and computing system 160. Operations 400 through 418 may be performed in a different order or with more or fewer operations than as is shown in FIG. 4. For ease of description, FIG. 4 is described in the context of computing device 110 of FIG. 1.

In accordance with the techniques of this disclosure, computing device 110 may accept a telephone call initiated by a caller (400). For example, CSS module 120 may intercept an incoming call from caller system 180 before telephone module 122 can alert a user.

Computing device 110 may output an audible interface as part of the telephone call that interrogates the caller (402). For example, CSS module 120 may attempt to obtain additional information about the caller, besides the general information already obtained via caller id information embedded in the telephony data received from caller system 180. CSS module 120 may cause UIC 212 to output CSS user interface 114 for display.

Computing device 110 may receive initial information from the caller via the audible interface (404). For instance, CSS module 120 may receive spoken audio data from the caller and transcribe the spoken audio data into text. The initial information may indicate a caller's identity or a purpose of a call, as some examples.

Computing device 110 may output a graphical user interface associated with the telephone call (406). For example, CSS module 120 may cause a transcription of the response from the caller to be displayed at UIC 212. CSS module 120 may optionally output one or more suggested actions, or specific questions as selectable graphical elements that the user of computing device 110 may select to direct the interrogation between the caller and CSS module 120.

In some case, the suggested actions or specific questions presented to the user may be automatically determined based on contextual information. For example, with access to a user's calendar, CSS module 120 may determine that the user is in a meeting and one of the suggested responses may be "can I call you back after my meeting".

In some case, the suggested actions or specific questions presented to the user may be automatically determined based on previous calls accepted from the other device or based on a current conversation between CSS module 120 and a caller. For example, with access to a user's call history, CSS module 120 may determine that the user typically chats with the caller in the evening and so a suggested response may be "can I call you tonight". Or, CSS module 120 may determine that when a caller states that he or she would like a call back that same day, CSS module may suggest a response to "call me tonight after 7 PM" (e.g., based on the user's calendar availability) as opposed to suggesting "can I call you back tomorrow."

Computing device 110 may adjust the audible interface provided over the telephone call based on the initial user input (410). For example, CSS module 120 may output spoken audio over the telephone call to the caller stating "the person you're trying to call would like to call you tonight? Is that ok?"

Computing device 110 may receive subsequent information from the caller via the audible interface (412). For instance, CSS module 120 may receive spoken audio signals from the caller, via the telephone call, and transcribe the spoken audio into text. The spoken audio may indicate that the caller is free all evening before 10:00 PM.

Computing device 110 may present at least part of the subsequent information (414). For example, CSS module 120 may cause UIC 212 to update the CSS user interface to include the transcription of the user's response "Yes, I am free all evening except after 10:00 PM."

Computing device 110 may receive subsequent user input in response to presenting the subsequent information (416).

For example, CSS module 120 may again update the CSS user interface with additional or alternative selectable replies and options. In some examples, a selectable option may include an option for a user to compose a custom reply that CS module 120 may speak to the caller over the telephone call. For instance, the user of computing device 110 may type at a graphical keyboard of computing device 110 to input a textual reply "Great, I will call you between 7 and 8."

Computing device 110 may terminate the audio user interface by ending the telephone call or enabling direct voice communication, via the telephone call, between the user and the caller (418). For example, after speaking to the caller the user's plan to return their call between 7:00 PM and 8:00 PM that evening, CSS module 120 may politely terminate the call by speaking "Good bye" or some other appropriate phrase.

In some cases, CSS module 120 may receive an input in response to displaying a CSS user interface that causes computing device 110 to perform some other action, besides terminating a telephone call. For instance, one selectable option provided in a CSS user interface, such as CSS user interface 114, may be an option to "respond via text" or "respond via e-mail". In response to a selection of an option for a textual response outside the telephone call, computing device 110 may automatically launch a text editor for the user to compose the message.

Through performance of the described techniques, an on-device CSS is provided. By executing the on-device CSS locally (i.e., without sharing information about a telephone call to other computing systems or devices), the described techniques enhance privacy (e.g., by eliminating the need to share audio of a telephone call and/or a transcription with remote servers, even if trusted, for analysis). Furthermore, local execution of an example CSS ensures low-latency transcriptions as telephone audio need not be transmitted to a remote device for transcription and subsequent download. In addition, local execution of an example CSS minimizes any need for a data connection (e.g., cellular data, Wi-Fi®, or the like), thus reducing costs associated with maintaining a data connection beyond any necessary connection to conduct a telephone call.

Clause 1. A method comprising: accepting, by a computing device, a telephone call, from another device, initiated by a caller; prior to establishing a telephone user interface that receives spoken input from the user and outputs spoken audio from the caller, executing, by the computing device, a call screening service that outputs an audio user interface, to the other device and as part of the telephone call, wherein executing the call screening service comprises interrogating the caller, via the audio interface, for additional information including a purpose of the telephone call; and outputting, by the computing device, a graphical user interface associated with telephone call, wherein the graphical user interface includes an indication of the additional information obtained via the audio user interface that interrogates the caller.

Clause 2. The method of clause 1, further comprising: classifying, by the computing device, the caller as being a particular type of caller from a plurality of caller types; adapting, by the computing device, based on the particular type of caller, the audio user interface that interrogates the caller to obtain specific information for the particular type of caller that is different from other information obtained for other types of callers from the plurality of caller type, wherein the additional information obtained from the caller via the audio user interface includes the specific information for the type of caller.

Clause 3. The method of any of clauses 1 or 2, wherein the graphical user interface comprises a transcription of the additional information.

Clause 4. The method of clause 3, further comprising: updating the transcription included in the graphical user interface while the additional information is received.

Clause 5. The method of any of clauses 3 or 4, wherein executing the call screening service comprises: outputting, by the computing device, to the other device and as part of the telephone call, telephone audio outputs; receiving, by the computing device, from the other device and as part of the telephone call, telephone audio inputs, wherein the transcription of the spoken input to the audio user interface includes text of the telephone audio outputs and the telephone audio inputs.

Clause 6. The method of any of clauses 1-4, further comprising: displaying, by the computing device, a graphical user interface that receives user inputs for adjusting the audio user interface; receiving, by the computing device, via the graphical user interface, one or more user inputs; and controlling, based on the one or more user inputs, the audio user interface that interrogates the caller.

Clause 7. The method of any of clause 6, wherein the one or more inputs comprise a user command to output a specific response or a specific question, and controlling the audio user interface that interrogates the caller comprises outputting, to the other device, and as part of the telephone call, audio indicative of the specific response or the specific question.

Clause 8. The method of clause 7, wherein the specific response or the specific question is presented as a suggested action when presenting the graphical user interface alerting the user of the computing device to the telephone call.

Clause 9. The method of clause 7 or 8, further comprising: automatically determining, based on contextual information associated with the computing device, the specific response or the specific question.

Clause 10. The method of any of clauses 7-9, automatically determining, based on previous calls accepted from the other device, the specific response or the specific question.

Clause 11. The method of any of clause 6-10, wherein the one or more inputs comprise a user command to accept or reject the telephone call, and controlling the audio user interface that interrogates the caller comprises terminating the audio user interface as part of ending the telephone call or enabling direct voice communication, via the telephone call, between the user and the caller.

Clause 12. A mobile device comprising at least one processor configured to locally execute a call-screening service module that performs any of the methods of clause 1-11.

Clause 13. A computing system comprising at least one processor configured to perform any of the methods of clauses 1-11.

Clause 14. A computing system comprising means for performing any of the methods of clauses 1-11.

Clause 15. A computer-readable storage medium comprising instructions that, when executed, cause at least one processor to perform any of the methods of clauses 1-11.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
  accepting, by a computing device, a telephone call, from a caller device, initiated by a caller;
  prior to establishing a telephone user interface that receives spoken input from a user and outputs spoken audio from the caller, executing an on-device call screening service at the computing device accepting the telephone call, wherein the call screening service is configured to output an audio user interface to the caller device and as part of the telephone call, wherein executing the call screening service comprises interrogating the caller, via the audio user interface, for additional information including a purpose of the telephone call, wherein the interrogating of the caller comprises:
    receiving, by the call screening service and by a graphical user interface of the computing device accepting the telephone call, a query input by the user,
    providing, via the audio user interface and to the caller, the query, and receiving, via the audio user interface and in response to the query, the additional information as spoken audio from the caller; and outputting, to the user and by the graphical user interface of the computing device accepting the telephone call, an indication of the additional information obtained via the audio user interface that interrogates the caller.

2. The method of claim 1, further comprising:

classifying, by the computing device, the caller as being a particular type of caller from a plurality of caller types;

adapting, by the computing device, based on the particular type of caller, the audio user interface that interrogates the caller to obtain specific information for the particular type of caller that is different from other information obtained for other types of callers from the plurality of caller types, wherein the additional information obtained from the caller via the audio user interface includes the specific information for the particular type of caller.

3. The method of claim 1, wherein the graphical user interface comprises a transcription of the additional information.

4. The method of claim 3, further comprising:

updating the transcription included in the graphical user interface after the additional information is received.

5. The method of claim 4, wherein executing the call screening service comprises:

outputting, by the computing device, to the caller device and as part of the telephone call, telephone audio outputs; and receiving, by the computing device, from the caller device and as part of the telephone call, telephone audio inputs, wherein the transcription of the spoken input to the audio user interface includes text of the telephone audio outputs and the telephone audio inputs.

6. The method of claim 1, further comprising:

displaying, by the computing device and after executing the call screening service that outputs the audio user interface, the graphical user interface that includes elements for adjusting the audio user interface;

receiving, by the computing device, via the graphical user interface, one or more user inputs associated with the elements for adjusting the audio user interface; and controlling, based on the one or more user inputs, the audio user interface that interrogates the caller.

7. The method of claim 6, wherein:

the one or more user inputs comprise a user command to output a specific response or a specific question; and controlling the audio user interface that interrogates the caller comprises outputting, to the caller device, and as part of the telephone call, audio indicative of the specific response or the specific question.

8. The method of claim 7, wherein the specific response or the specific question is presented as a suggested action when presenting the graphical user interface alerting the user of the computing device to the telephone call.

9. The method of claim 7, further comprising:

automatically determining, based on contextual information associated with the computing device, the specific response or the specific question.

10. The method of claim 9, further comprising:

automatically determining, based on previous calls accepted from the caller device, the specific response or the specific question.

11. The method of claim 6, wherein the one or more user inputs comprise a user command to accept or reject the telephone call, and controlling the audio user interface that interrogates the caller comprises terminating the audio user interface as part of ending the telephone call or enabling direct voice communication, via the telephone call, between the user and the caller.

12. The method of claim 1, further comprising:

performing, by the computing device, a speech-to-text translation of the additional information.

13. The method of claim 1, wherein the query input by the user is a text input, and further comprising:

performing, by the computing device, a text-to-speech translation of the text input; and outputting, by the computing device, to the caller device and as part of the telephone call, a telephone audio output based on the text-to-speech translation.

14. The method of claim 1, wherein the query input by the user is a voice input, and further comprising:

outputting, via the audio user interface, to the caller device and as part of the telephone call, a computer generated spoken output corresponding to the voice input.

15. The method of claim 1, further comprising:

receiving a user indication to establish the telephone user interface that receives the spoken input from the user and outputs the spoken audio from the caller; and establishing the telephone user interface in response to the user indication.

16. The method of claim 1, wherein the computing device accepting the telephone call is a mobile device.

17. A computing system comprising at least one processor configured to:

accept, by the computing system, a telephone call, from a caller device, initiated by a caller;

prior to establishment of a telephone user interface that receives spoken input from a user and outputs spoken audio from the caller, execute an on-device call screening service of at the computing system accepting the telephone call, wherein the call screening service is configured to output an audio user interface to the caller device and as part of the telephone call, the execution of the call screening service comprising interrogation of the caller, via the audio user interface, for additional information including a purpose of the telephone call, wherein the interrogation of the caller comprises:

receiving, by the call screening service and by a graphical user interface of the computing system accepting the telephone call, a query input by the user, providing, via the audio user interface and to the caller, the query, and receiving, via the audio user interface and in response to the query, the additional information as spoken audio from the caller; and output, to the user and by the graphical user interface of the computing system accepting the telephone call, an indication of the additional information obtained via the audio user interface that interrogates the caller.

18. The computing system of claim 17, wherein the graphical user interface comprises a transcription of the additional information.

19. The computing system of claim 18, the at least one processor further configured to:

update the transcription included in the graphical user interface after the additional information is received.

20. The computing system of claim 19, wherein the at least one processor in execution of the call screening service is configured to:
- output, by the computing system, to the caller device and as part of the telephone call, telephone audio outputs; and
- receive, by the computing system, from the caller device and as part of the telephone call, telephone audio inputs,
- wherein the transcription of the spoken input to the audio user interface includes text of the telephone audio outputs and the telephone audio inputs.

21. The computing system of claim 17, the at least one processor further configured to:
- display, by the computing system and after execution of the call screening service that outputs the audio user interface, a graphical user interface that includes elements for adjusting the audio user interface;
- receive, by the computing system, via the graphical user interface, one or more user inputs associated with the elements for adjusting the audio user interface; and
- control, based on the one or more user inputs, the audio user interface that interrogates the caller.

22. A computer-readable storage medium comprising instructions that, when executed, cause at least one processor to perform:
- accept, by a computing system, a telephone call, from a caller device, initiated by a caller;
- prior to establishment of a telephone user interface that receives spoken input from a user and outputs spoken audio from the caller, execute an on-device call screening service at the computing system accepting the telephone call, wherein the call screening service is configured to output an audio user interface to the caller device and as part of the telephone call, the execution of the call screening service comprising interrogation of the caller, via the audio user interface, for additional information including a purpose of the telephone call, wherein the interrogation of the caller comprises:
  - receiving, by the call screening service and by a graphical user interface of the computing system accepting the telephone call, a query input by the user,
  - providing, via the audio user interface and to the caller, the query, and
  - receiving, via the audio user interface and in response to the query, the additional information as spoken audio from the caller; and
- output, to the user and by the graphical user interface of the computing system accepting the telephone call, indication of the additional information obtained via the audio user interface that interrogates the caller.

23. The computer-readable storage medium of claim 22, wherein the graphical user interface comprises a transcription of the additional information.

24. The computer-readable storage medium of claim 23, the computer-readable storage medium comprising further instructions that, when executed, cause the at least one processor to:
- update the transcription included in the graphical user interface after the additional information is received.

25. The computer-readable storage medium of claim 24, wherein the instructions, when executed to execute the call screening service, cause the at least one processor to:
- output, by the computing system, to the caller device and as part of the telephone call, telephone audio outputs; and
- receive, by the computing system, from the caller device and as part of the telephone call, telephone audio inputs,
- wherein the transcription of the spoken input to the audio user interface includes text of the telephone audio outputs and the telephone audio inputs.

\* \* \* \* \*